United States Patent
Shiraki

(10) Patent No.: US 10,850,642 B2
(45) Date of Patent: Dec. 1, 2020

(54) SEAT SLIDE DEVICE

(71) Applicant: Toyota Body Seiko Co., LTD., Takahama (JP)

(72) Inventor: Shin Shiraki, Takahama (JP)

(73) Assignee: Toyota Body Seiko Co., LTD., Takahama (JP)

( * ) Notice: Subject to any disclaimer, the term of this patent is extended or adjusted under 35 U.S.C. 154(b) by 0 days.

(21) Appl. No.: 16/381,597

(22) Filed: Apr. 11, 2019

(65) Prior Publication Data

US 2019/0232823 A1    Aug. 1, 2019

Related U.S. Application Data

(62) Division of application No. 15/725,975, filed on Oct. 5, 2017.

(30) Foreign Application Priority Data

Oct. 14, 2016    (JP) .................................. 2016-202439
Apr. 19, 2017    (JP) .................................. 2017-082685

(51) Int. Cl.
*B60N 2/07*    (2006.01)
*B60N 2/075*    (2006.01)
*B60N 2/08*    (2006.01)

(52) U.S. Cl.
CPC .............. *B60N 2/07* (2013.01); *B60N 2/075* (2013.01); *B60N 2/0705* (2013.01);
(Continued)

(58) Field of Classification Search
CPC ...... B60N 2/07; B60N 2/0705; B60N 2/0715; B60N 2/0843; B60N 2/075; B60N 2/0702;
(Continued)

(56) References Cited

U.S. PATENT DOCUMENTS 4,511,187 A * 4/1985 Rees .................... B60N 2/0705
248/430
6,109,584 A * 8/2000 Garrido ................ B60N 2/0715
248/429

(Continued)

FOREIGN PATENT DOCUMENTS

JP    H10-100752 A    4/1998
JP    2013-018439 A    1/2013
WO    WO 2016/009495 A1    1/2016

OTHER PUBLICATIONS

International Search Report and Written Opinion for International Application No. PCT/JP2014/068800, dated Oct. 7, 2014.

*Primary Examiner* — Christopher Garft
(74) *Attorney, Agent, or Firm* — Wolf, Greenfield & Sacks, P.C.

(57) ABSTRACT

A seat slide device that can change sliding resistance when a seat is made to slide in accordance with a situation is provided. A seat slide device includes a lower rail fixed to a floor of a vehicle and an upper rail fixed to a seat of the vehicle and supported to be movable with respect to the lower rail. On the upper rail, a sliding member in contact with the slid surface of the lower rail from above is provided and configured such that the sliding resistance borne by the sliding member when the upper rail is moved is changed by a load in a vertical direction borne by the seat.

1 Claim, 16 Drawing Sheets

(52) U.S. Cl.
CPC ......... *B60N 2/0715* (2013.01); *B60N 2/0818* (2013.01); *B60N 2/0843* (2013.01)

(58) Field of Classification Search
CPC .. B60N 2/0806; B60N 2/0812; B60N 2/0818; B60N 2/0825
USPC ........................................................ 248/430
See application file for complete search history.

(56) References Cited

U.S. PATENT DOCUMENTS

| | | |
|---|---|---|
| 8,955,814 B2 | 2/2015 | Moriyama et al. |
| 10,040,374 B2 | 8/2018 | Nakamura et al. |
| 2004/0089785 A1* | 5/2004 | McCullen .............. B60N 2/071 248/429 |
| 2011/0233366 A1 | 9/2011 | Mizuno et al. |
| 2012/0061547 A1* | 3/2012 | Moriyama ........... B60N 2/0705 248/430 |
| 2012/0061548 A1 | 3/2012 | Moriyama et al. |
| 2013/0015312 A1* | 1/2013 | Shiraki ................ B60N 2/0843 248/429 |
| 2014/0110554 A1* | 4/2014 | Oya .................... B60N 2/0722 248/430 |
| 2016/0339808 A1* | 11/2016 | Mizuno ................ B60N 2/0843 |
| 2017/0144569 A1 | 5/2017 | Nakamura et al. |
| 2017/0368963 A1 | 12/2017 | Watanabe et al. |
| 2018/0105074 A1 | 4/2018 | Shiraki |

\* cited by examiner

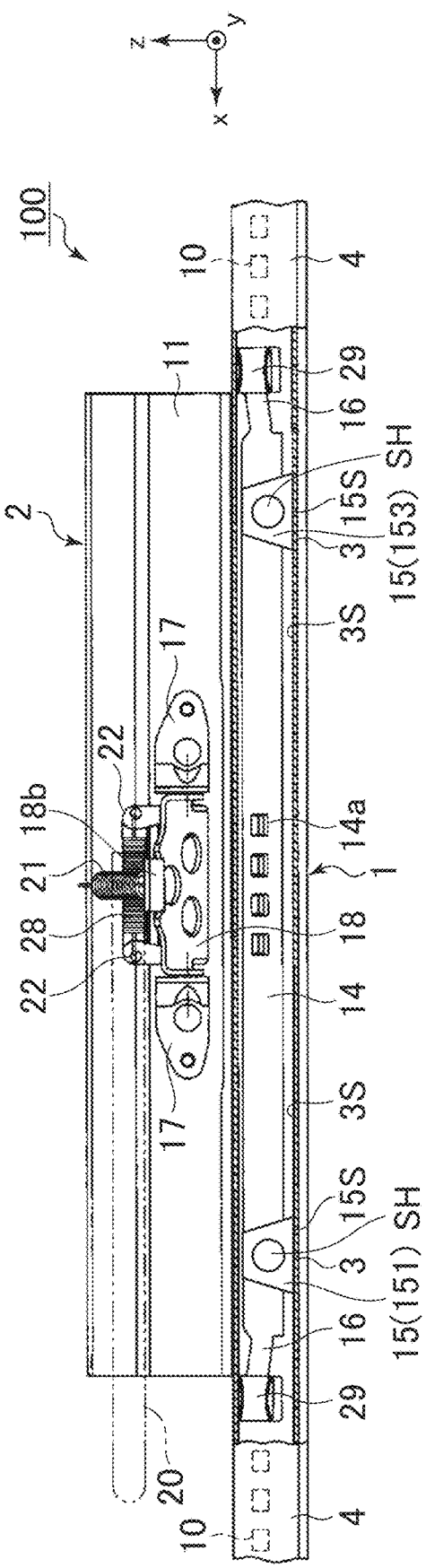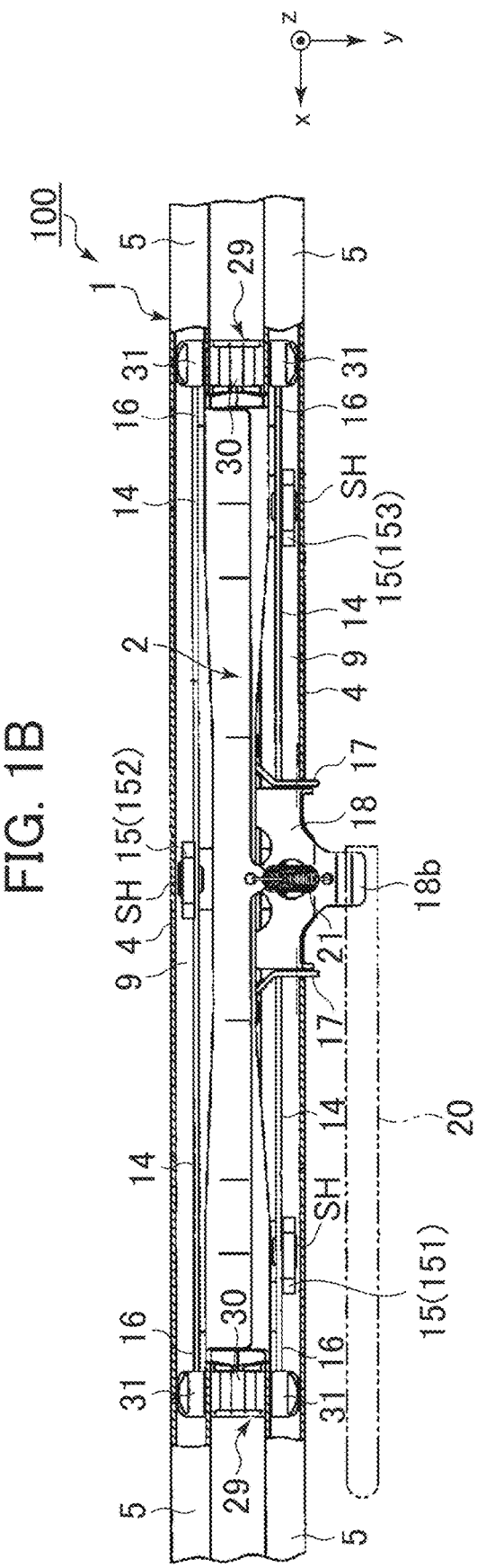

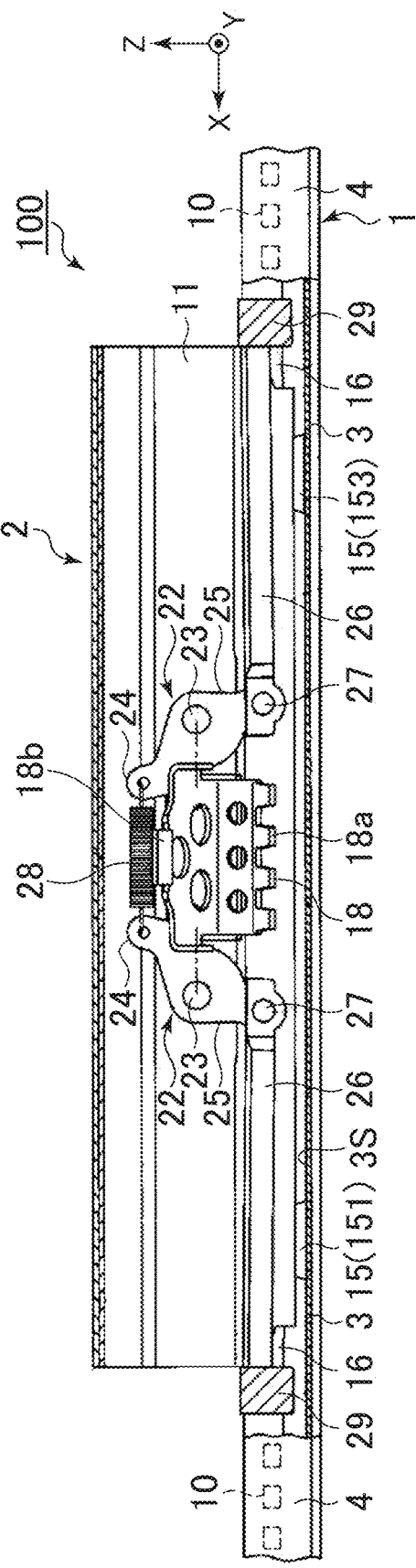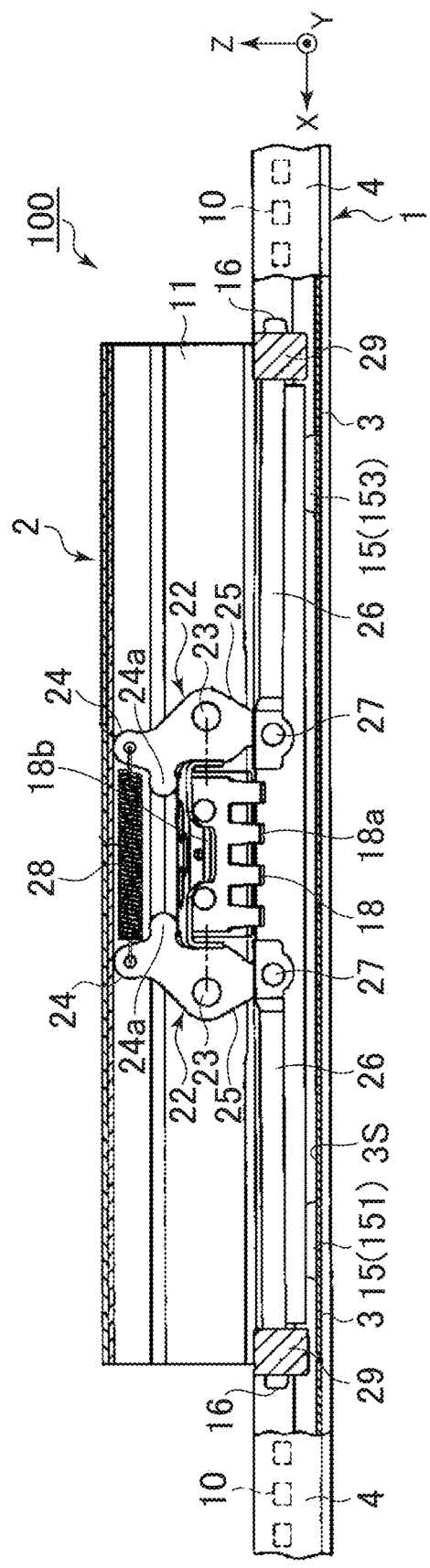

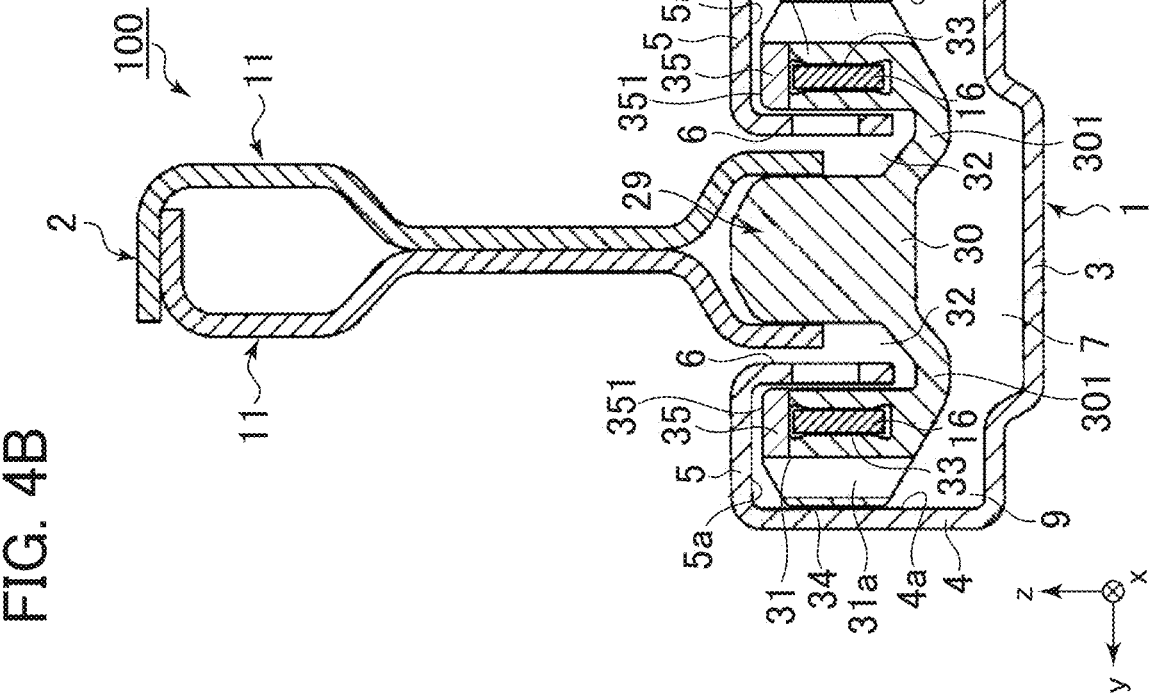
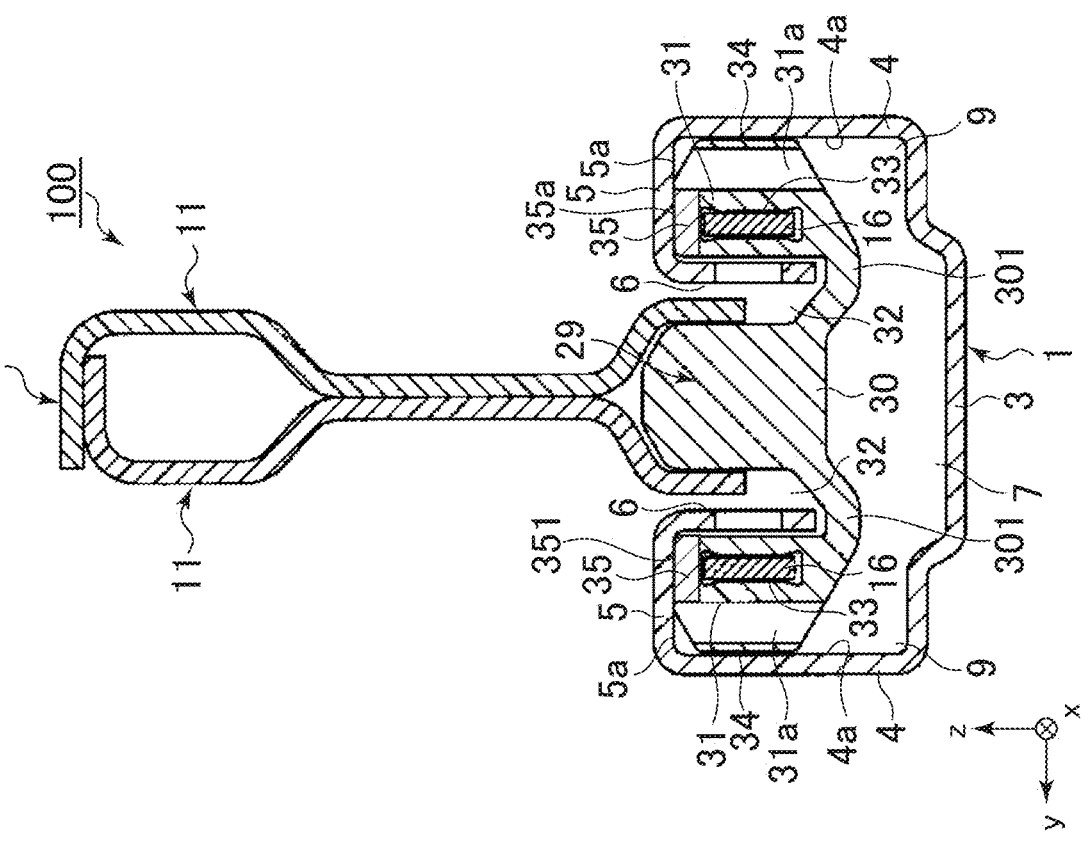

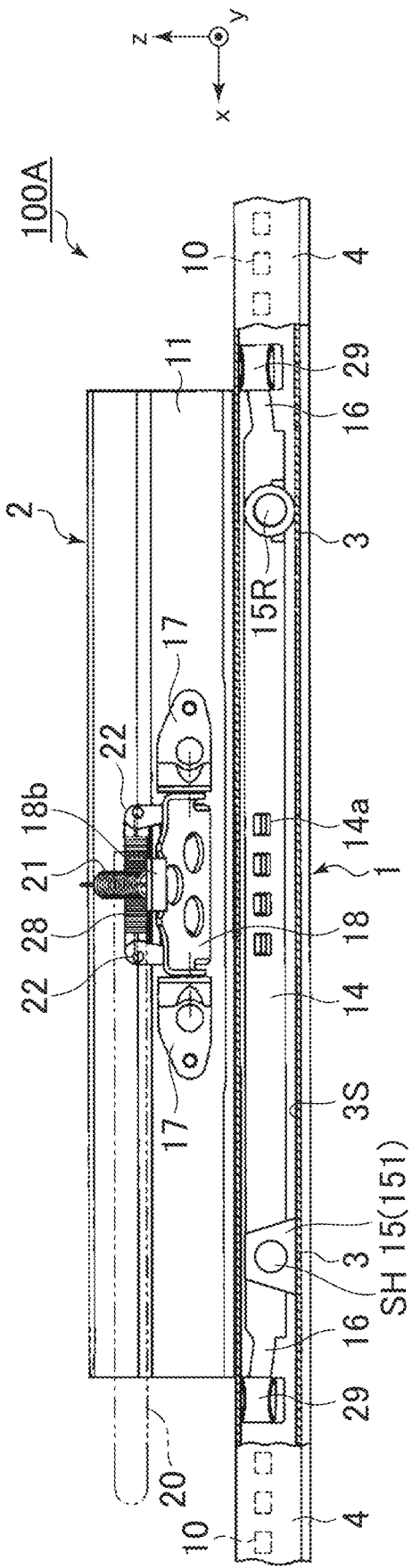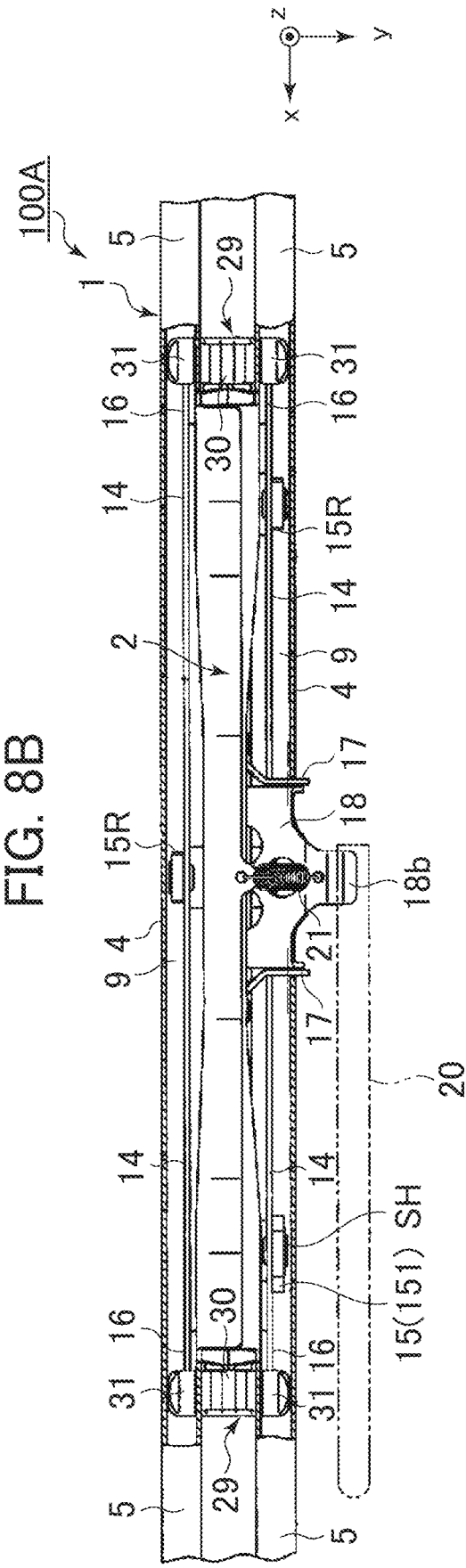

FIG. 16
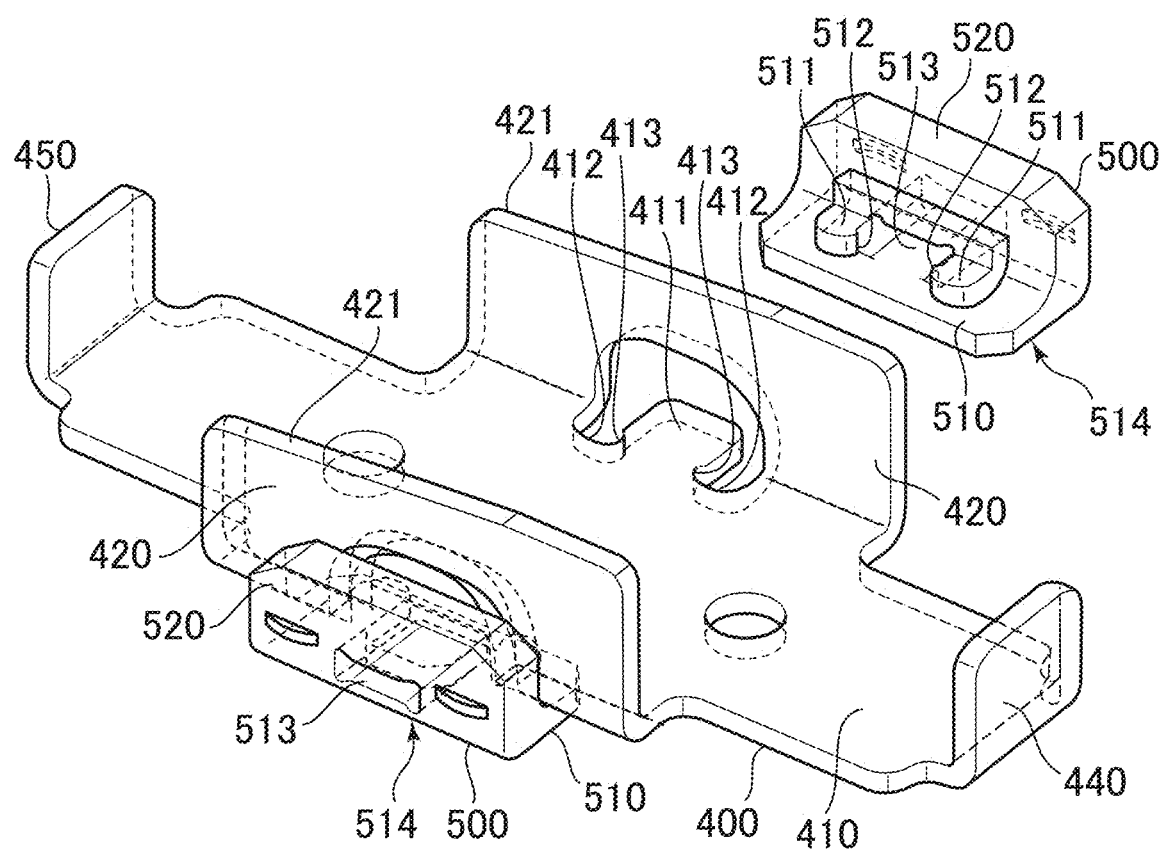
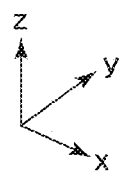

SEAT SLIDE DEVICE

RELATED CASE INFORMATION

This application is a divisional of U.S. application Ser. No. 15/725,975, filed Oct. 5, 2017, which claims priority to Japanese application number 2016-202439, filed on Oct. 14, 2016, and Japanese application number 2017-082685, filed on Apr. 19, 2017. The entire contents of these applications are incorporated herein by reference in their entireties.

BACKGROUND OF THE INVENTION

Field of the Invention

The present invention relates to a seat slide device provided in a vehicle.

Description of the Related Art

A seat slide device is a device allowing a seat provided in a vehicle to move in the front-back direction. The seat slide device includes a lower rail fixed to a floor of the vehicle and an upper rail fixed to the bottom of the seat, and is constituted such that the upper rail is supported to be movable with respect to the lower rail.

At normal times, the seat slide device is in a state where movement of the upper rail with respect to the lower rail is restricted, that is, a lock state. The seat can be moved together with the upper rail in the front-back direction, only when an occupant operates a lever and the lock state is released.

In the seat slide device described in International Publication No. WO 2016/009495 (Patent Literature 1), the seat slide device is constituted such that, when the seat is moved in the front-back direction in an unlock state, sliding resistance when the seat is moved to the forward side is larger than the sliding resistance when it is moved to the rearward side. Thus, even in a state where the lower rail has a slight downward inclination toward the forward side, such a phenomenon that the seat slides toward the forward side by its own weight due to the inclination can be prevented. That is, stability of sliding movement in the unlock state can be improved.

An operation of moving the unlocked seat forward and rearward is performed in a state where an occupant is seated on the seat or is performed in a state where the occupant is not seated. In the former case, if a seat moving speed becomes too large, the occupant feels anxiety in some cases. Thus, the sliding resistance at movement is preferably high to some degree so that the seat moving speed is suppressed as appropriate. On the other hand, in the latter case, the sliding resistance at movement is preferably low so that the occupant can perform the operation of moving the seat with a light force.

Moreover, even when the occupant moves the seat forward and rearward in the seated state, if the occupant is a child, the sliding resistance at movement is preferably low so that a child with low strength can perform the operation of moving the seat with a light force. As described above, intensity of the preferable sliding resistance at the seat movement differs depending on the situation.

The present invention has been devised in view of such problem, and an object of the present invention is to provide a seat slide device which can change the sliding resistance in accordance with a situation when the seat is to be slid.

SUMMARY OF THE INVENTION

In order to solve the problem, a seat slide device according to the present invention is a seat slide device provided in a vehicle, the seat slide device including: a lower rail fixed to a floor of a vehicle; and an upper rail fixed to a seat of the vehicle and supported to be capable of sliding with respect to the lower rail. On the upper rail, a sliding member brought into contact with a slid surface of the lower rail from above is provided and is constituted such that sliding resistance borne by the sliding member when the upper rail is moved is changed depending on a load in a vertical direction borne by the seat.

In the seat slide device with such configuration, as a member for generating the sliding resistance when the seat is moved, the sliding member is provided on the upper rail. The sliding member is brought into contact with the slid surface of the lower rail from above. The sliding resistance when the seat is moved is generated as the sliding resistance borne by the sliding member when the upper rail is moved, that is, a frictional force. The sliding resistance changes depending on a load in a vertical direction borne by the seat.

Thus, when the seat is moved in a state where an occupant is not seated on a seat, for example, the load in the vertical direction borne by the seat becomes smaller, and the sliding resistance borne by the sliding member also becomes smaller. Similarly, when a child with a light weight is seated, the load in the vertical direction borne by the seat also becomes smaller, and the sliding resistance borne by the sliding member also becomes smaller. On the other hand, when an adult with a heavy weight is seated, the load in the vertical direction borne by the seat becomes larger, and the sliding resistance borne by the sliding member becomes larger.

As described above, in the seat slide device with the aforementioned configuration, the sliding resistance when the seat is to be slid can be changed as appropriate in accordance with a situation.

According to the present invention, the seat slide device which can change the sliding resistance when the seat is to be slid in accordance with the situation is provided.

BRIEF DESCRIPTION OF THE DRAWINGS

FIGS. 1A and 1B are views illustrating an entire shape of a seat slide device according to a first embodiment of the present invention;

FIGS. 2A and 2B are views illustrating an internal structure of the seat slide device illustrated in FIGS. 1A and 1B;

FIGS. 4A and 4B are sectional views for explaining a function of a movable member;

FIGS. 8A and 8B are views illustrating an entire shape of a seat slide device according to a second embodiment of the present invention;

FIG. 16 is a view illustrating configurations of a plate member and the sliding member of the seat slide device according to the fourth embodiment of the present invention.

DETAILED DESCRIPTION OF THE PREFERRED EMBODIMENTS

Figure 3A:
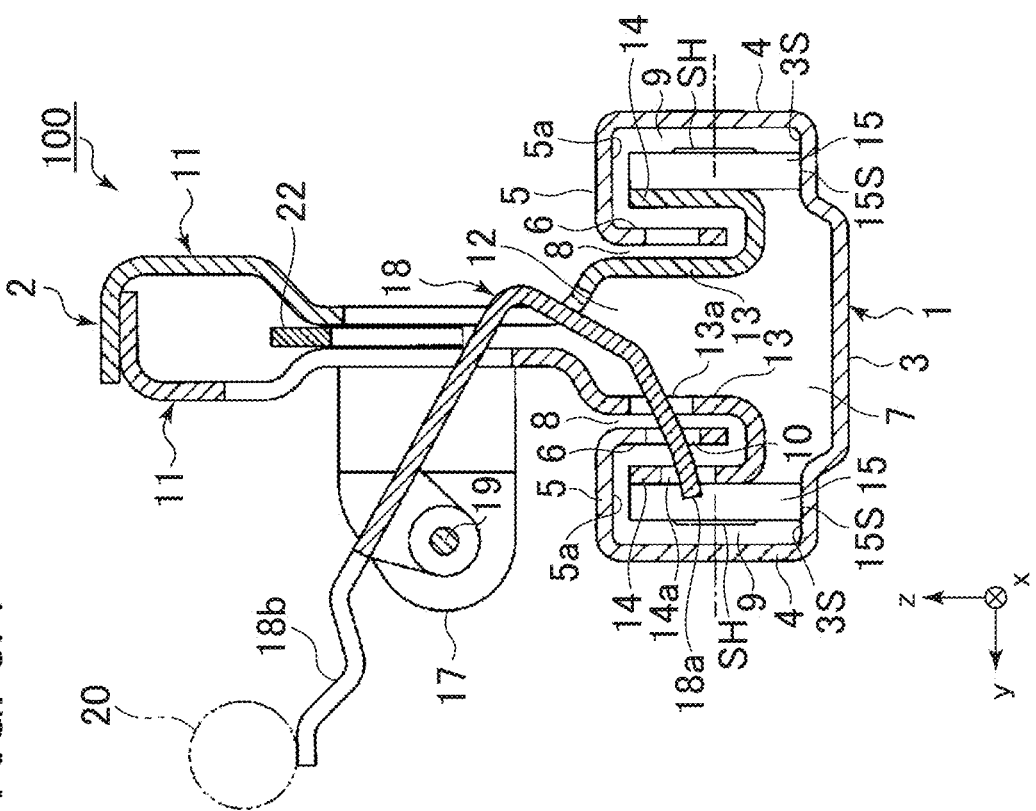
FIGS. 3A and 3B are sectional views for explaining a function of a lock member of the seat slide device illustrated in FIGS. 1A and 1B.

Embodiments of the present invention are explained below with reference to the accompanying drawings. To facilitate understanding of the explanation, the same reference numerals and signs denote the same components in the drawings as much as possible. Redundant explanation of the components is omitted.

A configuration of a seat slide device 100 according to a first embodiment of the present invention will be explained with reference mainly to FIGS. 1A and 1B. The seat slide device 100 is provided between a floor and a seat (neither of them is shown) of a vehicle and supports the seat in a state in which the seat is movable (slidable) in the front-back direction. The seat slide device 100 has a lower rail 1 and an upper rail 2. A combination of the lower rail 1 and the upper rail 2 is provided in two sets for one seat.

The lower rail 1 is a member fixed to the floor of the vehicle. The two lower rails 1 provided on a lower side of one seat are provided so as to be arrayed in the left-right direction in a state with the respective longitudinal directions along the front-back direction of the vehicle.

In FIGS. 1A and 1B, a direction from the rearward side to the forward side of the vehicle is represented as an x direction, and an x axis is set in the x direction. A direction from the right side to the left side of the vehicle is represented as a y direction, and a y axis is set in the y direction. Further, a direction from the lower side to the upper side of the vehicle is represented as a z direction, and a z axis is set in the z direction. In the following drawings, the x axis, the y axis, and the z axis are set in the same manner.

The upper rail 2 is a member fixed to the seat of the vehicle. The upper rail 2 is fixed to a bottom surface of the seat. The two upper rails 2 fixed to one seat are provided so as to be arrayed in the left-right direction in a state with the respective longitudinal direction along the front-back direction of the vehicle. The upper rail 2 is supported in a state movable along the x axis with respect to the lower rail 1 provided on a lower side thereof.

Figure 3B:
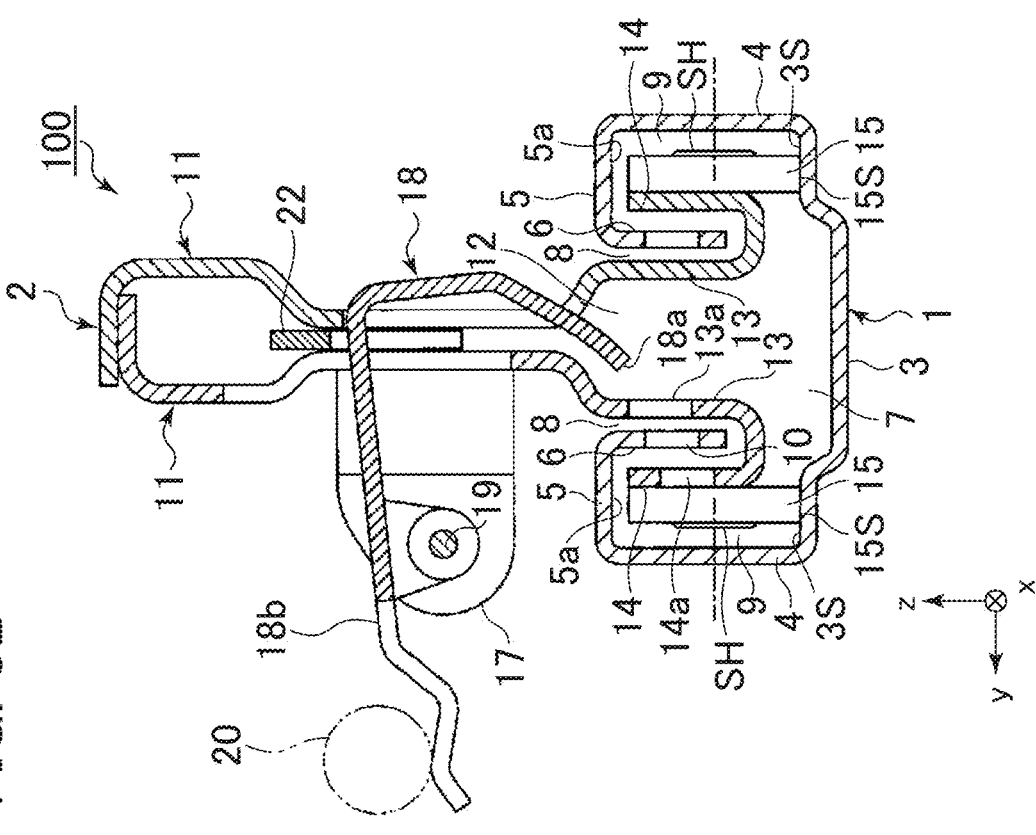

The configuration of the lower rail 1 will be explained. As shown in FIGS. 3A and 3B, the entire lower rail 1 is formed by a metal plate. The lower rail 1 has a bottom plate section 3, a side plate section 4, an upper plate section 5, and a dead plate section 6.

The bottom plate section 3 is a portion closest to the −z direction side in the lower rail 1 and is directly fixed to the floor. The bottom plate section 3 has a generally horizontal flat plate shape in its entirety. The side plate section 4 is a portion formed so as to extend in the z direction from a side end portion in the y direction and a side end portion in the −y direction of the bottom plate section 3, respectively. FIG. 1A illustrates a state where a part of the side plate section 4 is cut away so that an arm plate section 14 and the like disposed inside the lower rail 1 is shown.

The upper plate section 5 is a portion formed so as to extend from the z direction side end portion of each of the side plate sections 4 toward the center side in the y direction. The upper plate section 5 is provided along a horizontal plane and is opposed to the bottom plate section 3. A surface on the −z direction side in the upper plate section 5, that is, the surface on the lower side is a contacted surface 5a with which a movable member 29 which will be described later is brought into contact. FIG. 1B illustrates a state where a part of the upper plate section 5 is cut away so that the arm plate section 14 and the like (which will be described later) disposed inside the lower rail 1 is shown.

The dead plate section 6 is a portion formed so as to extend from an end portion in the upper plate section 5 on a side opposite to each of the side plate sections 4 in the −z direction. Each of the dead plate sections 6 is separated from each other and is opposed to the side plate section 4, respectively. A gap is formed between the end portion on the −z direction side in the dead plate section 6 and the bottom plate section 3.

A plurality of rectangular openings 10 is formed on the one disposed on the y direction side of the pair of dead plate sections 6. As shown in FIG. 1A, the openings 10 are formed so as to be arrayed in one row along the x direction. The opening 10 is a hole through which a claw section 18a of a lock member 18 which will be described later is inserted.

In the space formed inside the lower rail 1, a space surrounded by the bottom plate section 3, the side plate section 4, the upper plate section 5, and the dead plate sections 6 is illustrated in FIGS. 3A and 3B as a space 9. A space sandwiched by the bottom plate section 3 and the pair of dead plate sections 6 is illustrated in FIGS. 3A and 3B as a space 7. An opening sandwiched by the pair of upper plate sections 5, that is, the opening formed on an upper end side of the space 7 is illustrated in FIGS. 3A and 3B as a space 8.

The configuration of the upper rail 2 will be explained. As shown in FIGS. 3A and 3B, the upper rail 2 is formed by combining two metal plates 11. The upper rail 2 has a side plate section 13 and an arm plate section 14 on its −z direction side portion.

The side plate section 13 is a portion in the metal plate 11 inserted into the space 7 through the opening 8. Most of the side plate section 13 is in parallel with the dead plate section 6, and is provided so as to face the dead plate section 6. On one disposed on the y direction side in the pair of side plate sections 13, a plurality of rectangular openings 13a is formed. The openings 13a are formed so as to be arrayed in one row along the x direction. A shape and an arrangement interval of each of the openings 13a is substantially equal to the shape and the arrangement interval of the openings 10. The opening 13a is a hole through which the claw section 18a of the lock member 18 is inserted similarly to the opening 10. A space sandwiched by the pair of side plate sections 13 is illustrated in FIGS. 3A and 3B as a space 12.

A vicinity of the end portion of the side plate section 13 on the −z direction side is bent so as to expand outward along the y axis. The arm plate section 14 is a portion formed so as to extend from the bent portion toward the z direction side through the space 9. The arm plate section 14 is in parallel with the dead plate section 6 and is provided so as to face the dead plate section 6 in the space 9. On the one disposed on the y direction side in the pair of arm plate sections 14, a plurality of rectangular openings 14a is formed. The openings 14a are formed so as to be arrayed in one row along the x direction. A shape and an arrangement interval of each of the openings 14a are equal to the shape and the arrangement interval of the openings 10. An x coordinate of a position where each of the openings 14a is formed is equal to the x coordinate of a position where the opening 13a is formed in the side plate section 13. The opening 14a is a hole into which the claw section 18a of the lock member 18 is inserted similarly to the opening 10 and the opening 13a.

On a surface in the arm plate section 14 opposed to the side plate section 4, the sliding member 15 is fixed. The sliding member 15 is a plate-shaped member formed by a resin and has a trapezoidal shape when seen from the y direction. A lower surface 15S of the sliding member 15 is a flat plane and is a portion to be a bottom side of the trapezoid. The lower surface 15S protrudes toward the lower side more than a lower end of the arm plate section 14. The lower surface 15S is in a state in contact with the upper surface of the bottom plate section 3 in its entirety.

A shaft SH which is a columnar member is fixed to the side plate section 4. The shaft SH is provided so as to protrude outward from the side plate section 4 in a state where its center axis follows the y axis. A circular through hole is formed in each of the sliding members 15, and the shaft SH is inserted into the through-hole. That is, each of the sliding members 15 is fixed to the side plate section 4 of the lower rail 1 by being fitted in the shaft SH from the side.

The sliding member 15 may be generally formed by a resin but only a portion in contact with the upper surface of the bottom plate section 3 (a slid surface 3S which will be described later) may be formed by a resin while the other portions by another material.

As shown in FIG. 1B, on the arm plate section 14 on the y direction side, two sliding members 15 are disposed so as to be arrayed along the x direction. On the other hand, on the arm plate section 14 on the -y direction side, one sliding member 15 is disposed at a position to be a center in the x direction. The upper rail 2 is supported by these three sliding members 15 from below. As described above, the sliding members 15 are provided in plurality along a moving direction (x direction) of the upper rail 2.

In the following explanation, the portion in the upper surface of the bottom plate section 3 with which the lower surface 15S of the sliding member 15 is in contact is noted as a "slid surface 3S". In the three sliding members 15, the one disposed closest to the x direction side is also noted as a "sliding member 151", the one disposed at the center is also noted as a "sliding member 152", and the one disposed closest to the -x direction side is also noted as a "sliding member 153".

Each of the sliding members 15 is in contact with the slid surface 3S of the lower rail 1 from above. When the seat is moved in the front-back direction, each of the sliding members 15 moves along the x axis while sliding on the slid surface 3S. At that time, since a frictional force is generated between the lower surface 15S and the slid surface 3S, the upper rail 2 moves while bearing the sliding resistance caused by the frictional force. An effect obtained by providing the sliding member 15 as above will be explained later.

The lock member 18 will be explained. The lock member 18 is a member performing an operation of switching between a lock state where movement of the upper rail 2 is restricted and an unlock state where the movement of the upper rail 2 is allowed. FIG. 3A illustrates the lock state, while FIG. 3B illustrates the unlock state. As shown in both views, the lock member 18 is formed from a bent metal plate. The lock member 18 is attached to, via a bracket 17, the metal plate 11 disposed on the y direction side of the pair of metal plates 11. The bracket 17 rotatably supports the lock member 18 with a rotating shaft 19 provided in parallel to the x axis.

The lock member 18 includes claw sections 18a and an operation section 18b. A plurality of claw sections 18a is formed at an end portion of the lock member 18. Each of the claw sections 18a is formed in a strip shape and arrayed side by side in one row along the x axis. The width (the dimension in the x direction) of each of the claw sections 18a is slightly smaller than the width of each of the openings 13a, the openings 10, and the opening 14a. Further, a disposition interval of the claw sections 18a is equal to a disposition interval of the openings 10 and the like. As shown in FIG. 3A, the lock state is a state in which the respective claw sections 18a pierce through the openings 13a, the openings 10, and the openings 14a. Consequently, the movement of the upper rail 2 with respect to the lower rail 1 is restricted.

The operation section 18b is a portion formed at an end portion on the opposite side to the claw sections 18a across the rotating shaft 19 in the lock member 18. A handle 20, which is a portion operated by the occupant, is coupled to the operation section 18b. When the occupant operates the handle 20 from the lock state shown in FIG. 3A, the lock member 18 rotates around the rotating shaft 19, and the seat slide device 100 shifts to a state in which the respective claw sections 18a are pulled out from the openings 13a, the openings 10, and the openings 14a, that is, the unlock state (FIG. 3B). Consequently, the restriction of the movement of the upper rail 2 with respect to the lower rail 1 is released, and the upper rail 2 can move along the x axis.

As shown in FIGS. 1A and 1B, one end of a coil spring 21 is connected to the vicinity of the operation section 18b in the lock member 18. The other end of the coil spring 21 is connected to the vicinity of the end portion on the z direction side of the upper rail 2. The operation section 18b is urged to the z direction side by the coil spring 21. Therefore, when the occupant is not performing the operation of the handle 20, a state in which the respective claw sections 18a pierce through the openings 13a and the like, that is, the lock state shown in FIG. 3A is maintained.

Subsequently, the internal configuration of the seat slide device 100 will be explained with reference mainly to FIGS. 2A and 2B. In FIGS. 2A and 2B, a state is shown in which a part of the metal plate 11 disposed on the y direction side of the pair of metal plates 11 and a part of the y direction side (the side plate section 4, the upper plate section 5, and the dead plate section 6) in the lower rail 1 are respectively cut out. The lock state is shown in FIG. 2A, and the unlock state is shown in FIG. 2B.

At positions to be both sides of the lock member 18 along the x axis, a pair of levers 22 is provided. The respective levers 22 are substantially flat plate-shaped members and are attached to the metal plate 11 via rotating shafts 23 in which their normal directions are set along the y axis. The rotating shaft 23 is a shaft along the y axis. The lever 22 is mounted in a state rotatable around the rotating shaft 23. As shown in FIGS. 3A and 3B, the levers 22 are housed in a space between the pair of metal plates 11. As shown in FIGS. 2A and 2B, the shapes of the respective levers 22 are symmetric to each other.

The lever 22 has an upper arm section 24, a transmission section 24a, and a lower arm section 25. The upper arm section 24 is a portion on an end portion on the z direction side of the lever 22 further protruding toward the z direction side. One end of the coil spring 28 is connected to the upper arm section 24 of each of the levers 22. The respective upper arm sections 24 bear forces in directions getting closer to each other by the coil spring 28.

The transmission section 24a is a portion protruding toward the lock member 18 side at a position lower than the upper arm section 24. In the lock state in FIG. 2A, the transmission section 24a and the lock member 18 are separated from each other. The respective upper arm sections 24 are in a state close to each other by the force of the coil spring 28.

The lower arm section 25 is a portion on the −z direction side end portion of the lever 22 further protruding toward the −z direction side. One end of a slider 26 is connected to each of the lower arm sections 25 in a rotatable state. The slider 26 is a rod-shaped member disposed in a state with its longitudinal direction along the x axis. An end portion in the slider 26 on the opposite side to the lower arm section 25, a movable member 29 is provided. Specific configuration of the slider 26 and the movable member 29 will be explained later.

When the operation section 18b of the lock member 18 is pushed up in the z direction side and the unlock state is established as shown in FIG. 2B, the lock member 18 comes into contact with the transmission section 24a, and the transmission section 24a is also lifted together with the lock member 18. Consequently, each of the upper arm sections 24 moves in a direction away from each other while resisting the force of the coil spring 28. Since the lever 22 rotates, each of the lower arm sections 25 moves in a direction getting closer to each other. As a result, each of the sliders 26 and the movable members 29 moves toward the lock member 18 side. When returning from the unlock state to the lock state, each of the sliders 26 and the movable members 29 moves in the direction away from the lock member 18.

Figure 5A:
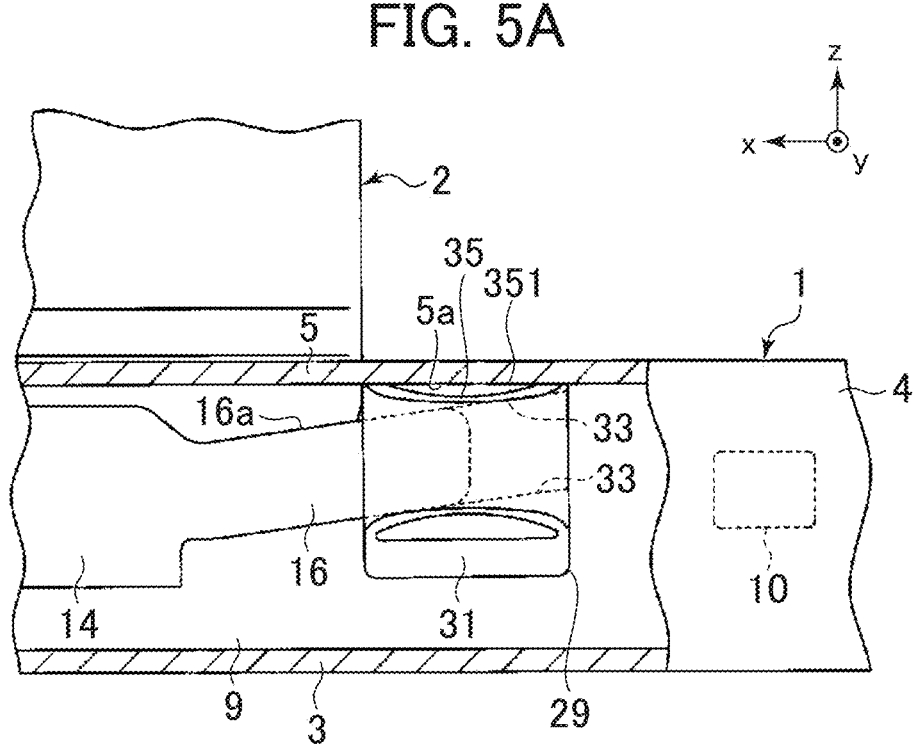
FIGS. 5A and 5B are sectional views for explaining a function of the movable member.
Figure 5B:
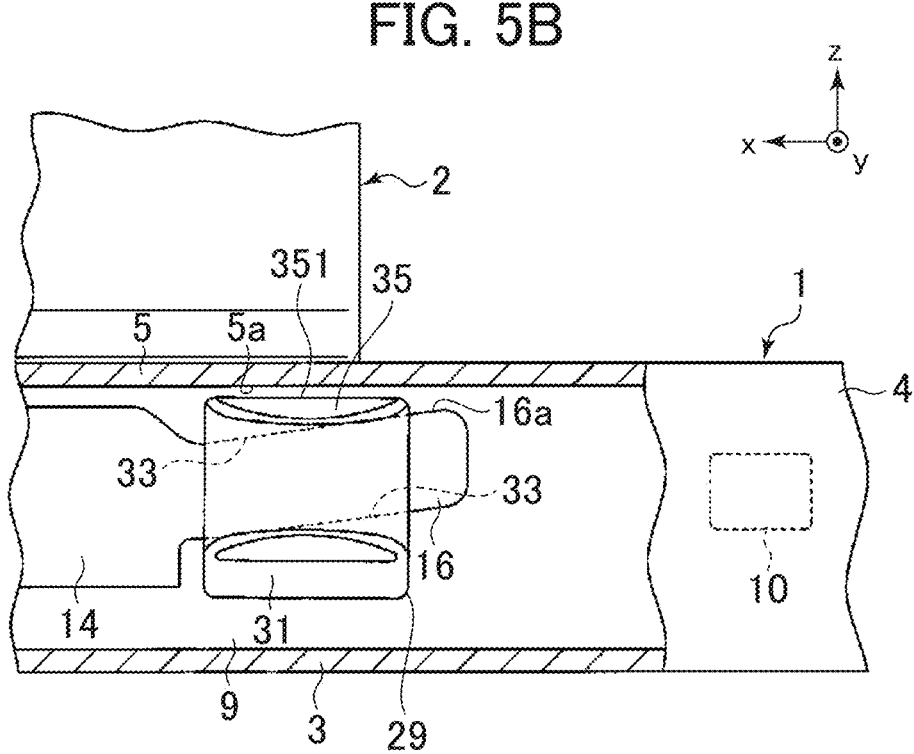
Figure 6A:
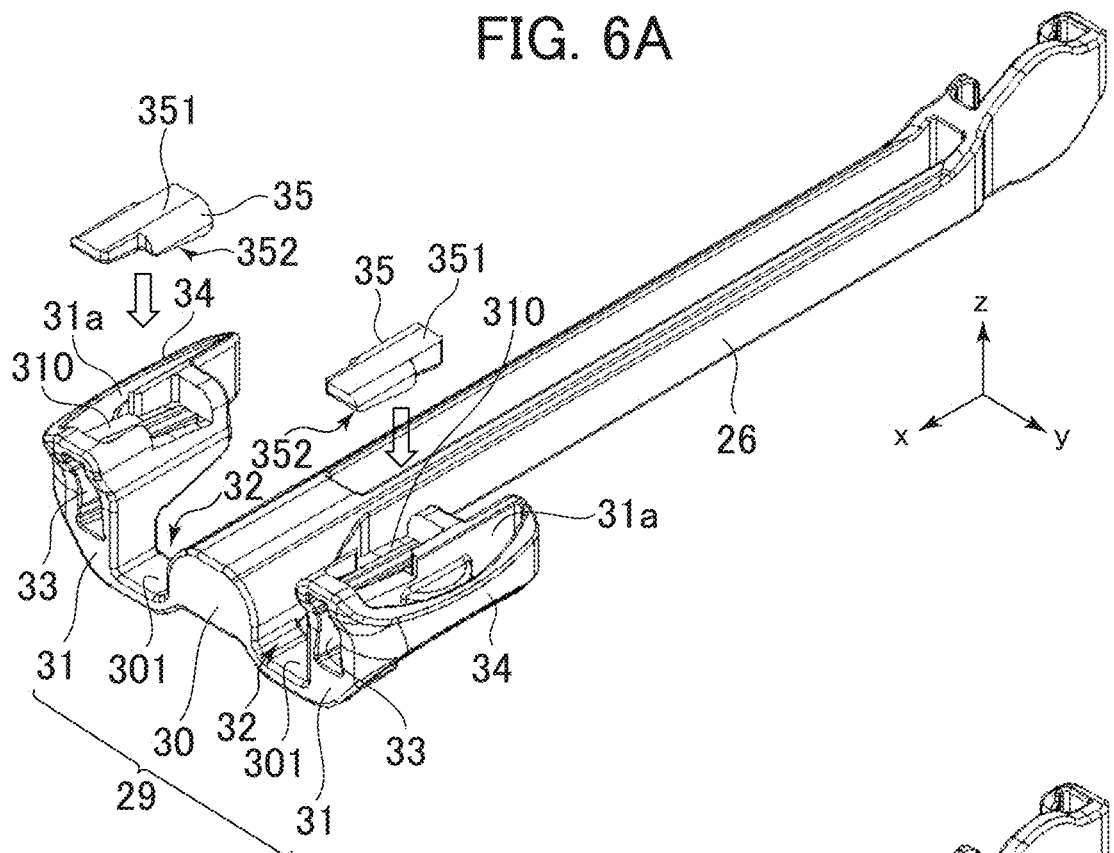
FIGS. 6A and 6B are perspective views illustrating shapes of the movable member and a slider.

With reference to FIGS. 4A, 4B, 5A, 5B, 6A, and 6B, the configuration of the slider 26 and the movable member 29 will be explained. Actual shapes of the slider 26 and the movable member 29 are shapes shown in the perspective view in FIG. 6B, but the shapes are schematically shown in FIGS. 4A, 4B, 5A, and 5B. In FIG. 6A, a state where a part of (a hard member 35 which will be described later) the movable member 29 is removed is shown as an exploded assembly view.

Figure 6B:
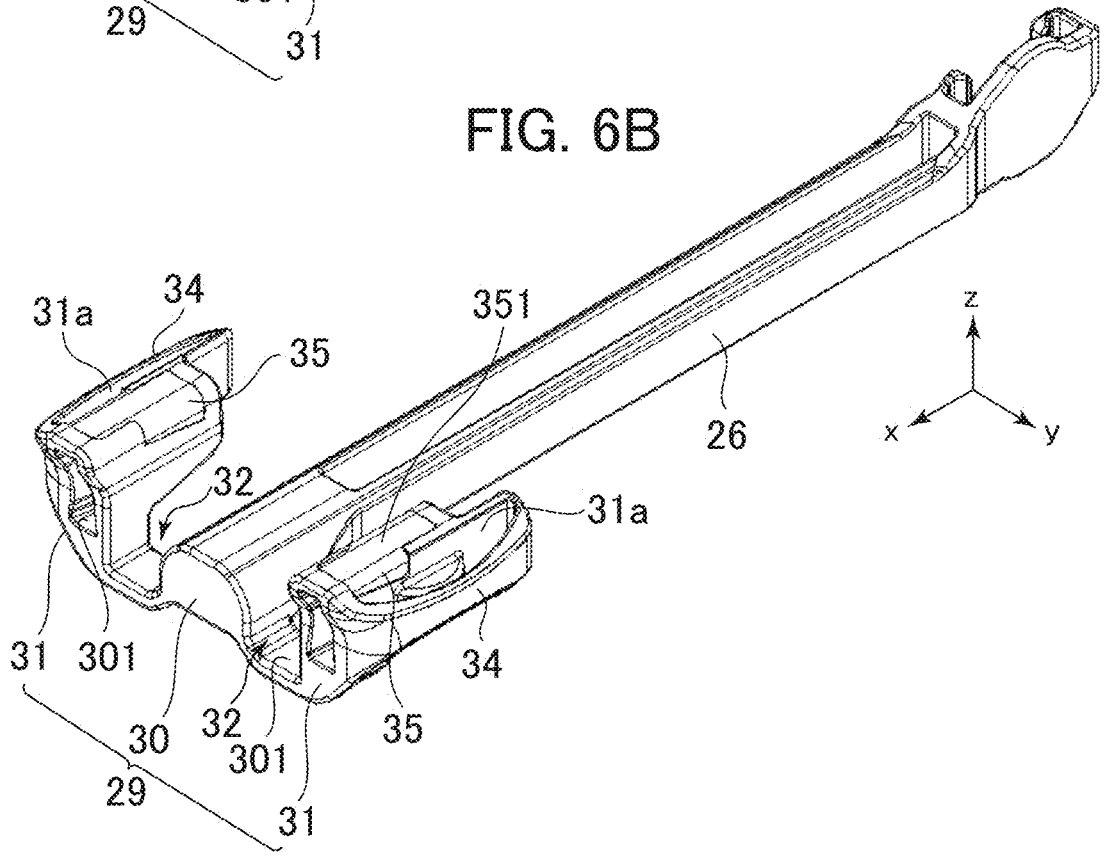

As shown in FIGS. 6A and 6B, in this embodiment, most (excluding the hard member 35) of the movable member 29 and the slider 26 are integrally formed by a resin. The movable member 29 has an intermediate section 30 and arm sections 31.

The intermediate section 30 is a portion connected to the end portions of the slider 26 and supports the pair of arm sections 31. As shown in FIGS. 4A and 4B, the intermediate section 30 (and the slider 26) is accommodated in the space 7.

The arm sections 31 are provided on both on the y direction side and the −y direction side of the intermediate section 30. Each of the arm sections 31 and the intermediate section 30 is connected by a support section 301 extending along the y axis from the −z direction side end portion of the intermediate section 30. As shown in FIGS. 4A and 4B, each of the arm sections 31 is accommodated in the space 9. Further, the respective support sections 301 are disposed at positions between the −z direction side end portion of the dead plate section 6 and the bottom plate section 3.

In FIGS. 4A, 4B, 6A and 6B, a groove-shaped space surrounded by the arm section 31, the support section 301, and the intermediate section 30 is shown as a passage 32. In the passage 32, the dead plate section 6 of the lower rail 1 is accommodated.

In the arm section 31, a through-hole 33 having a rectangular section and piercing substantially along the x axis is formed. Into the through-hole 33, a guide section 16 formed on the end portion of the arm plate section 14 is inserted. As shown in FIGS. 5A and 5B, the guide section 16 has a dimension (width) along the z axis smaller than the other portions of the arm plate section 14. The guide section 16 has its longitudinal direction inclined with respect to the x axis so as to get closer to the upper plate section 5 as it goes closer to its distal end side. An end surface of the guide section 16 on the z direction side is an inclined surface 16a formed at a part of the upper rail 2. The inclined surface 16a is a surface inclined to a horizontal plane so as to go closer to the z direction side as it goes farther from the lock member 18.

An inner wall surface of the through-hole 33 is substantially in parallel with a surface of the guide section 16 opposed to that. Thus, the inner wall surface (that is, a top surface) of the through-hole 33 in the z direction side is a surface inclined similarly to the inclined surface 16a. The same applies to the inner wall surface (that is, a bottom surface) of the through-hole 33 in the −z direction side.

At a position in the arm section 31 opposite to the intermediate section 30 with the through-hole 33 between them, a through-hole 31a piercing through the z direction is formed. A portion of the side plate section 4 side farther from the through-hole 31a is an elastic wall 34. The elastic wall 34 is in contact with the inner wall surface of the side plate section 4.

Before the movable member 29 and the slider 26 are accommodated inside the lower rail 1, a width of the movable member 29 along the y direction is slightly larger than a width of the space sandwiched by the pair of side plate sections 4. Thus, in the state where the movable members 29 and the sliders 26 are accommodated inside the lower rail 1, the respective elastic walls 34 are in a state elastically deformed toward the intermediate section 30 side. Further, due to the similar reason, the support section 301 is also in the state slightly elastically deformed. Since most of the movable member 29 is formed by a resin, an error in dimensional accuracy can be absorbed by the elastic deformation in the configuration.

FIGS. 4A and 5A show the lock state, and FIGS. 4B and 5B show the unlock state. In the unlock state shown in FIG. 4B and the like, a gap is formed between the movable member 29 and the inner wall surface (hereinafter, noted as the "contacted surface 5a") of the upper plate section 5. That is, the movable member 29 which is a member held by the upper rail 2 is in a state away from the contacted surface 5a which is a part of the lower rail 1. Thus, a frictional force or the like is not generated between the movable member 29 and the contacted surface 5a, and the lower rail 1 can move smoothly along the x axis.

When the occupant operates the handle 20 and switches the unlock state to the lock state, as described above, the movable member 29 moves in the direction away from the lock member 18. At this time, as shown in FIG. 5A, the movable member 29 moves along the inclined surface 16a, and the gap between the movable member 29 and the contacted surface 5a gradually decreases and becomes 0 in the end. At this time, the movable member 29 is sandwiched between the inclined surface 16a and the contacted surface 5a as a wedge and is in a state pressed into contact with the contacted surface 5a. As a result, a force along the z direction and a frictional force along the x direction work between the movable member 29 and the contacted surface. Consequently, rattling (relative displacement along the z axis) across the lower rail 1 and the upper rail 2 is suppressed.

As described above, in this embodiment, an interlocking mechanism (mechanism including the lever 22, the slider 26, and the guide section 16) for moving the movable member 29 along the moving direction of the upper rail 2 in conjunction with the movement of the lock member 18 is provided. It is configured such that when the interlocking mechanism moves the movable member 29, the movable member 29 is guided along the inclined surface 16a formed on the upper rail 2, and a distance between the movable member 29 and the contacted surface 5a is changed. By means of such configuration, rattling of the upper rail 2 in the lock state can be suppressed while the upper rail 2 can be smoothly moved in the unlock state.

If deformation of the movable member 29 matters little, the entire movable member 29 may be formed by a resin. However, if the entire movable member 29 is formed by a resin, a relatively soft resin is sandwiched between the inclined surface 16a and the contacted surface 5a in the lock state. If the vehicle travels in this state, the movable member 29 made of a resin is deformed by an influence of vibration and is more deeply pushed into the gap between the inclined surface 16a and the contacted surface 5a in some cases. In that case, the movable member 29 is sandwiched between the inclined surface 16a and the contacted surface 5a by a strong force. If the occupant tries to switch the lock state to the unlock state by operating the handle 20 after such state, a force required for the operation of the handle 20, that is, the force to be applied by the occupant becomes large due to the influence caused by the movable member 29 strongly sandwiched as above. As a result, it is likely that a sense of discomfort may be given to the occupant.

Further, depending on the deformation or deflection of the movable member 29 accompanying vibration of the vehicle, it is also likely that a gap is generated between the movable member 29 and the contacted surface 5a, and a noise caused by rattling of the upper rail 2 is generated. As a result, a sense of unpleasantness could be given to the occupant.

Thus, in this embodiment, the aforementioned problem is solved by forming a part of the portion in the movable member 29 sandwiched between the inclined surface 16a and the contacted surface 5a by a member harder than the other portions.

As shown in FIG. 6A, on the portion in the arm section 31 on the z direction side of the through-hole 33, a through-hole 310 piercing the portion along the z axis is formed. The through-hole 310 is connected to an inside of the through-hole 33. In the through-hole 310, the hard member 35 is fitted from the z direction side. The through-hole 310 is a stepped hole and is constituted so that the hard member 35 does not drop into the through-hole 33. In this embodiment, the hard member 35 is formed by a metal (harder than a resin). A surface 351 on the z direction side in the hard member 35 is opposed to the contacted surface 5a of the lower rail 1. That is, the surface 351 of the hard member 35 is a portion in contact with the contacted surface 5a in the lock state.

Further, a surface 352 in the hard member 35 on the −z direction side is a surface dividing the z direction side of the through-hole 33. Thus, as shown in FIGS. 4A, 4B, 5A and 5B, the inclined surface 16a is in contact with the surface 352 of the hard member 35.

In the lock state shown in FIGS. 4A and 5A, the hard member 35 is sandwiched between the inclined surface 16a and the contacted surface 5a. The hard member 35 is not deformed or deflected easily as the resin. Thus, even if vibration of the vehicle occurs, the movable member 29 including the hard member 35 is not more deeply pushed into the gap between the inclined surface 16a and the contacted surface 5a. Since the movable member 29 is not sandwiched by a strong force, such a state can be maintained that the occupant can smoothly perform the operation for switching the lock state to the unlock state with a relatively light force.

Further, since deformation or deflection of the movable member 29 accompanying vibration of the vehicle is hardly caused, a gap is not generated between the movable member 29 and the contacted surface 5a. Thus, occurrence of a noise accompanying rattling of the upper rail 2 is reliably prevented in this embodiment.

In this embodiment, the part of the portion in the movable member 29 sandwiched between the inclined surface 16a and the contacted surface 5a is configured to be formed not by a resin but by a metal. Instead of such a mode, the entire portion in the movable member 29 sandwiched between the inclined surface 16a and the contacted surface 5a may be configured to be formed not by a resin but by a metal.

In this embodiment, a plurality of the movable members 29 is provided along the moving direction (direction along the x axis) of the upper rail 2. Thus, a force is not received in a direction in which the upper rail 2 rotates using the single movable member 29 as a fulcrum. As a result, rattling of the upper rail 2 with respect to the lower rail 1 is further prevented.

Figure 7A:
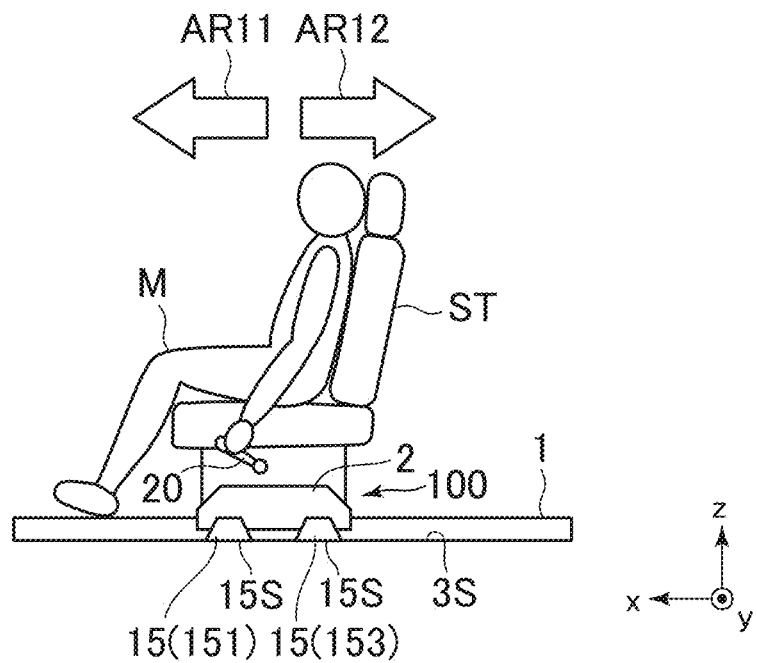
FIGS. 7A and 7B are views for explaining sliding resistance when seat is to be slid.
Figure 7B:
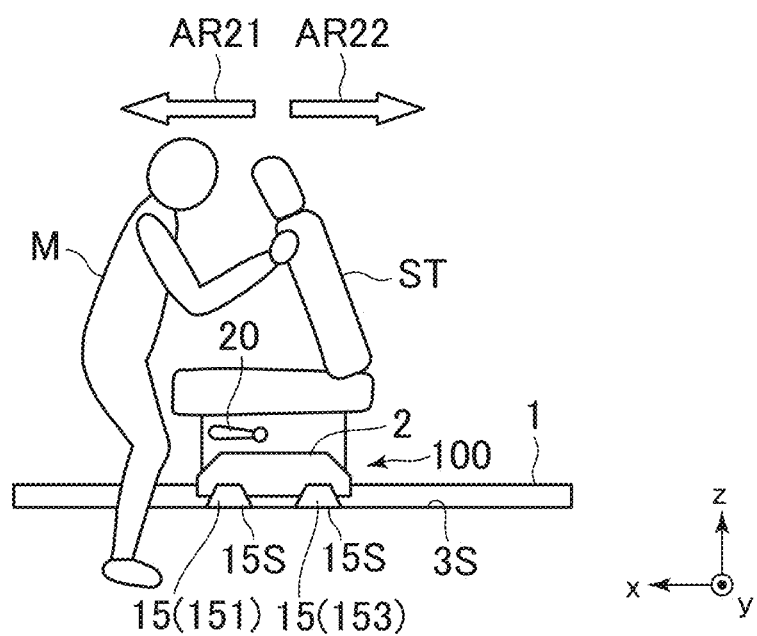

An effect of providing the sliding member 15 will be explained with reference to FIGS. 7A and 7B. FIG. 7A schematically shows that an occupant M sets the seat slide device 100 to the unlock state in a state seated on a seat ST and moves the seat ST forward and rearward. Further, FIG. 7B schematically shows that the occupant M sets the seat slide device 100 to the unlock state in a state not seated on the seat ST (state standing in the vicinity of the seat ST) and moves the seat ST forward and rearward.

In the state in FIG. 7A, application of a weight of the occupant M makes a load in the vertical direction borne by the seat ST relatively larger. The load is a force for pressing the lower surface 15S of the sliding member 15 to the slid surface 3S. Thus, a frictional force applied to the gap between the sliding member 15 and the slid surface 3S, that is, sliding resistance borne by the sliding member 15 when the upper rail 2 is moved forward and rearward also becomes relatively larger.

In general, the floor on which the seat slide device 100 is mounted has a downward inclination toward the forward side in many cases. Thus, if the sliding resistance when the seat ST is moved is too small, the seat ST on which the occupant M is seated slides to the forward side by its own weight, which might give anxiety to the occupant M.

However, with the seat slide device 100 according to this embodiment, the sliding resistance in the state where the occupant M is seated on the seat ST becomes large as in FIG.

7A. Thus, even in the unlock state, a phenomenon that the seat ST slides by its own weight along the downward inclination can be prevented. The increase in the sliding resistance is such a degree that prevents sliding of the seat ST by its own weight and thus, a working load for the occupant M to make the seat ST to slide does not become too large.

In FIG. 7A, a force required for making the seat ST to slide to the x direction is indicated by an arrow AR11. Further, the force required for making the seat ST to slide to the −x direction is indicated by an arrow AR12. Thicknesses of the respective arrows indicate intensities of the forces. In this embodiment, intensities of the respective forces indicates by these arrows are the same as each other. The "force required for making the seat ST to slide" indicated by the arrow AR11 and the like is substantially equal to the sliding resistance borne by the sliding member 15.

In the state in FIG. 7B, the weight of the occupant M is not applied to the seat ST. Thus, the load in the vertical direction borne by the seat ST is relatively small. With that, the frictional force applied to the gap between the sliding member 15 and the slid surface 3S, that is, the sliding resistance borne by the sliding member 15 when the upper rail 2 is moved forward and rearward is also relatively small.

As in FIG. 7B, in the state where the occupant M is not seated on the seat ST, even if the seat ST in the unlock state slides to the forward side by its own weight, there is no concern that anxiety is given to the occupant M. Thus, it is preferable that the sliding resistance borne by the sliding member 15 in the unlock state is made smaller so as to reduce a working load for the occupant M to make the seat ST to slide as in this embodiment.

In FIG. 7B, a force required for making the seat ST to slide to the x direction is indicated by an arrow AR21. Further, a force required for making the seat ST to slide in the −x direction is indicated by an arrow AR22. Thicknesses of the respective arrows indicate intensities of the forces. In this embodiment, the intensities of the respective forces indicated by these arrows are equal to each other. However, they are smaller than the forces indicated by the arrows AR11 and the like in FIG. 7A.

If the occupant M is a child, for example, the weight is smaller than that of an adult. Thus, the load in the vertical direction borne by the seat ST is smaller than that in FIG. 7A and larger than that in FIG. 7B. Consequently, the sliding resistance borne by the sliding member 15 in the unlock state is also smaller than that in FIG. 7A and larger than that in FIG. 7B. As a result, the working load for the occupant M to make the seat ST slide can be kept small to such a degree that even a child with a low strength can perform the operation easily while the sliding resistance is ensured to such a degree that anxiety is not given to the seated occupant M.

As described above, the seat slide device 100 according to this embodiment is constituted such that the sliding resistance borne by the sliding member 15 when the upper rail 2 is moved is changed in accordance with the load in the vertical direction borne by the seat ST. Thus, the sliding resistance can be appropriately changed in accordance with a situation when the seat ST is made to slide without requiring a complicated mechanism.

In this embodiment, three pieces of the sliding members 15 are provided, but the number of sliding members 15 may be two or less or four or more.

In this embodiment, the portion (lower surface 15S) of the sliding member 15 in contact with the slid surface 3S is a flat plane. Thus, the force applied from the sliding member 15 to the slid surface 3S is not concentrated within a narrow range, and damage such as indentation on the slid surface 3S can be prevented. Consequently, the entire slid surface 3S is maintained in a flat state, and the state where the upper rail 2 can smoothly move forward and rearward is maintained. Occurrence of a noise at movement of the upper rail 2 is also prevented.

A second embodiment of the present invention will be explained. As shown in FIGS. 8A and 8B, a seat slide device 100A according to the second embodiment has configuration in which the sliding member 152 and the sliding member 153 in the first embodiment (FIGS. 1A and 1B) are replaced by rollers 15R, respectively. As a result, in this embodiment, the two rollers 15R are provided at positions closer to a rearward side (−x direction side) in the upper rail 2 than the sliding member 15. The seat slide device 100A is different from the seat slide device 100 only in this point and the same as the seat slide device 100 in the other points. In the following, the points different from the first embodiment will be mainly explained, and explanation on those in common with the first embodiment will be omitted as appropriate.

The roller 15R is a wheel supported in a rotatable state with respect to the arm plate section 14. The roller 15R is placed on the upper surface (that is, the slid surface 3S) of the bottom plate section 3 and movably supports the upper rail 2 in a direction along the x axis. That is, the upper rail 2 is supported with respect to the slid surface 3S. When the seat ST is to be slid, the sliding resistance in the portion of the roller 15R becomes substantially zero.

Figure 9A:
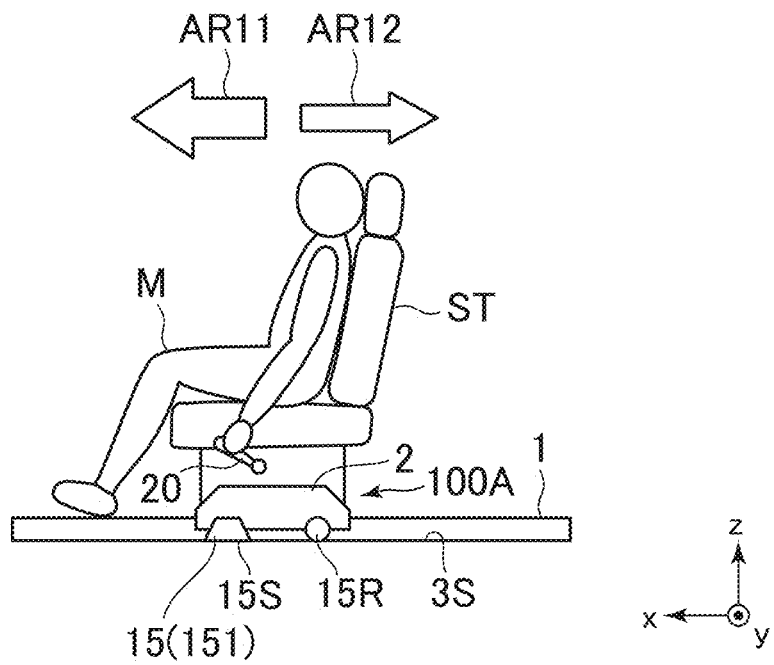
FIGS. 9A and 9B are views for explaining the sliding resistance when the seat is to be slid.
Figure 9B:
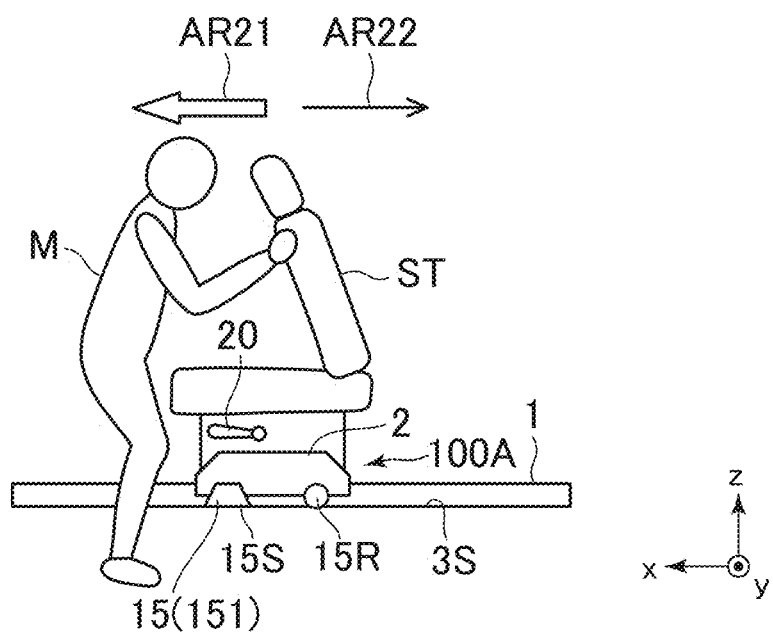

FIG. 9A schematically shows that the occupant M sets the seat slide device 100A to the unlock state in the state seated on the seat ST and moves the seat ST forward and rearward. FIG. 9B schematically shows that the occupant M sets the seat slide device 100A to the unlock state in the state not seated on the seat ST (state standing in the vicinity of the seat ST) and moves the seat ST forward and rearward.

In the state in FIG. 9A, the load in the vertical direction borne by the seat ST is relatively large. The load is a force pressing the lower surface 15S of the sliding member 15 to the slid surface 3S. Thus, the frictional force applied to a gap between the sliding member 15 and the slid surface 3S, that is, the sliding resistance borne by the sliding member 15 when the upper rail 2 is moved forward and rearward is also relatively large. This point is similar to the first embodiment shown in FIG. 7A.

When the seat ST is moved to the forward side, a force in a direction inclined to the forward side is applied to the seat ST. Thus, the force by which the sliding member 15 is pressed onto the slid surface 3S is larger than the force by which the roller 15R is pressed onto the slid surface 3S. However, the intensity of the force is substantially the same as that in the first embodiment. Thus, the sliding resistance (arrow AR11) borne by the sliding member 15 has the intensity of the level as the case in FIG. 7A.

On the other hand, when the seat ST is moved to the rearward side, the force in a direction inclined to the rearward side is applied to the seat ST. Thus, the force by which the sliding member 15 is pressed onto the slid surface 3S is smaller than the force by which the roller 15R is pressed onto the slid surface 3S. The roller 15R is strongly pressed onto the slid surface 3S, but the increase in the sliding resistance accompanying that is not generated. As a result, the intensity of the sliding resistance borne by the sliding member 15 (the arrow AR12) is smaller than the case in FIG. 7A.

As described above, in this embodiment, the sliding resistance when the seat ST is moved to the x direction side is larger than the sliding resistance when the seat ST is moved to the −x direction side. As already described, the floor on which the seat slide device 100 is mounted has a downward inclination toward the forward side in many cases. Thus, according to the seat slide device 100A according to this embodiment, the working load of the occupant M when the seat ST is moved to the forward side and the working load of the occupant M when the seat ST is moved to the rearward side can be made substantially equal.

In the state in FIG. 9B, the load in the vertical direction borne by the seat ST is relatively small. Thus, the frictional force applied to the gap between the sliding member 15 and the slid surface 3S, that is, the sliding resistance borne by the sliding member 15 when the upper rail 2 is moved forward and rearward is also relatively small. This point is similar to the first embodiment shown in FIG. 7B.

In the state in FIG. 9B, similarly to the above, the sliding resistance (the arrow AR21) when the seat ST is moved to the x direction side is larger than the sliding resistance (arrow AR22) when the seat ST is moved to the −x direction side. That is, the force indicated by the arrow AR21 in FIG. 9B is the force of the same degree as that in FIG. 7B, and the force indicated by the arrow AR22 in FIG. 9B is smaller than that in FIG. 7B.

Therefore, when the occupant M is not seated, the working load of the occupant M when the seat ST is moved to the forward side can be made substantially equal to the working load of the occupant M when the seat ST is moved to the rearward side while the sliding resistance is made smaller than the case of being seated in FIG. 9A.

In this embodiment, two pieces of the rollers 15R are provided, but the number of the rollers 15R may be one or three or more. In either case, it is only necessary that the roller 15R is provided at a position on a rearward side (−x direction side) from the sliding member 15.

If the floor on which the seat slide device 100 is mounted has a downward inclination toward the rearward side which is opposite to the above, the rollers 15R and the sliding member 15 may be configured to be switched with each other from those shown in FIGS. 8A and 8B. That is, the rollers 15R may be configured to be provided at positions on the forward side (x direction side) from the sliding member 15 in the upper rail 2. In this mode, too, the working load of the occupant M when the seat ST is moved to the forward side and the working load of the occupant M when the seat ST is moved to the forward side can be made substantially equal.

A third embodiment of the present invention will be explained with reference to FIGS. 10 to 12. A seat slide device 100B according to the third embodiment is different from the first embodiment in some shapes such as the lever 22 and the like. In the following, the points different from the first embodiment will be mainly explained, and explanation on those in common with the first embodiment will be omitted as appropriate.

Figure 10:
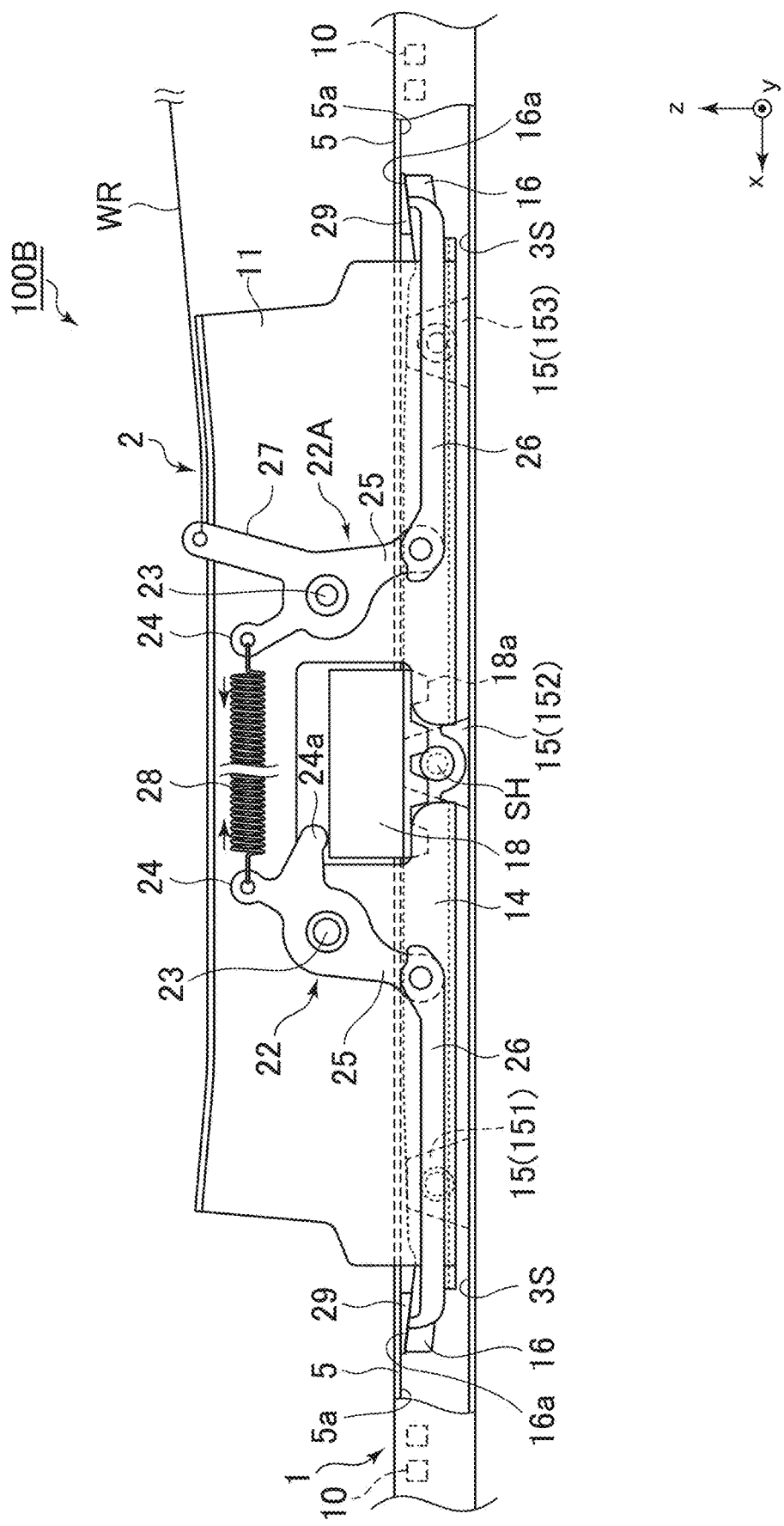
FIG. 10 is a view illustrating an internal structure of a seat slide device according to a third embodiment of the present invention.
Figure 11:
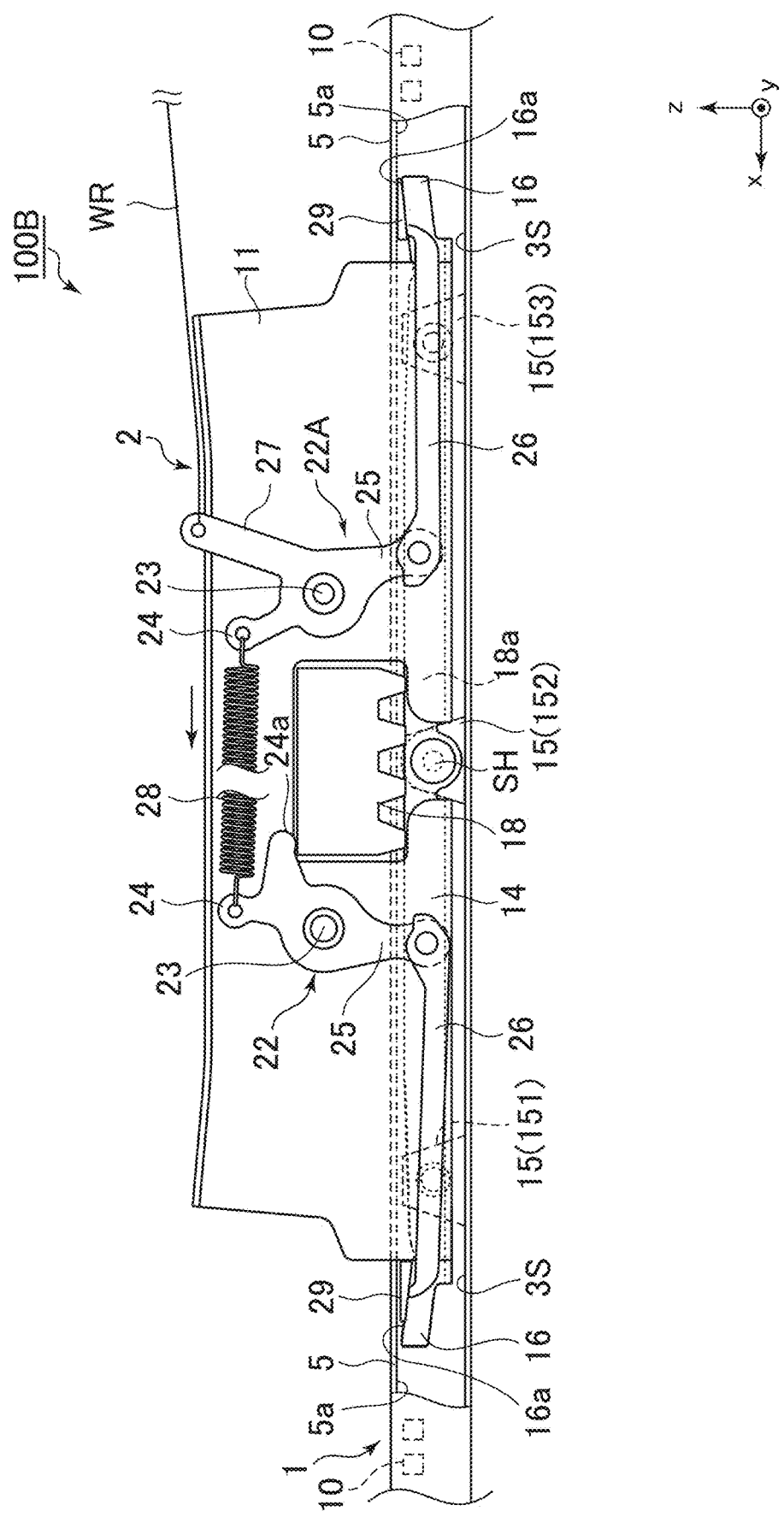
FIG. 11 is a view illustrating the internal structure of the seat slide device according to the third embodiment of the present invention.
Figure 12:
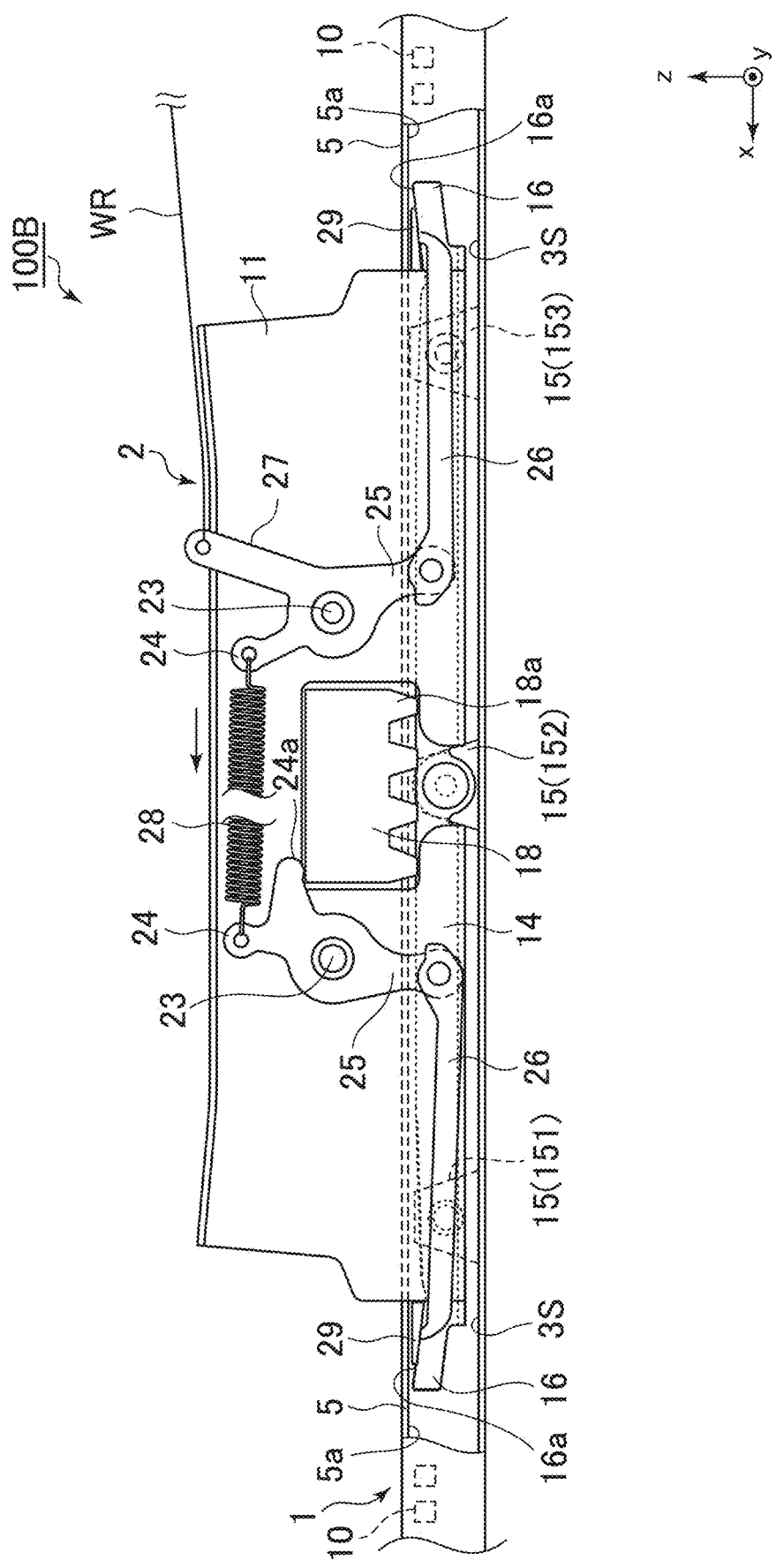
FIG. 12 is a view illustrating the internal structure of the seat slide device according to the third embodiment of the present invention.

In FIGS. 10 to 12, the shape of the movable member 29 is schematically shown. Specifically, a portion in the movable member 29 interposed between the upper plate section 5 and the guide section 16 (a part of the arm section 31) is drawn having a shape looking like a wedge connected to the distal end of the slider 26. The actual specific shape of the portion is the same as the shape in the first embodiment shown in FIGS. 1A, 1B and the like.

FIG. 10 shows an internal configuration of the seat slide device 100B in the lock state. In this embodiment, the shape of the lever 22 provided on the x direction side and the shape of a lever 22A provided on the −x direction side are not symmetric as in FIGS. 2A and 2B but are different from each other. The lever 22A provided on the −x direction side, that is, on the rearward side of the vehicle, a transmission section 24a is not formed but a connecting section 27 is formed instead. The connecting section 27 is formed so as to protrude upward from a portion in the lever 22A on the rearward side from the upper arm section 24. A wire WR is connected to the vicinity of the upper end portion of the connecting section 27.

This embodiment is configured such that, when a seatback portion of the seat ST is folded forward as shown in FIG. 7B, the wire WR is pulled to the −x direction side. In FIG. 10, the seatback portion of the seat ST is not folded but is in a state where the occupant M can be seated as in FIG. 7A.

In the lock state shown in FIG. 10, the transmission section 24a of the lever 22 is not lifted up by the lock member 18. Thus, the respective upper arm sections 24 of the lever 22 and the lever 22A are in the state closer to each other by the force of the coil spring 28. The respective movable members 29 bear the force in the direction separated from the lock member 18. At this time, each of the front and rear movable members 29 is sandwiched as wedges between the inclined surface 16a and the contacted surface 5a and is in a state brought into contact with and pressed onto the contacted surface 5a. Consequently, rattling (relative displacement along the z axis) between the lower rail 1 and the upper rail 2 is suppressed.

FIG. 11 shows a state inside the seat slide device 100B in the unlock state. In this state, when the transmission section 24a of the lever 22 is lifted up by the lock member 18, the lever 22 rotates around the rotating shaft 23 counterclockwise. As a result, the movable member 29 on the x direction side moves to the −x direction side, and the movable member 29 is pulled out from the gap between the inclined surface 16a and the contacted surface 5a. At this time and after, the frictional force is not generated between the movable member 29 on the x direction side and the contacted surface 5a.

On the other hand, since the transmission section 24a is not formed on the lever 22A, even in the unlock state in FIG. 11, the lever 22A is not lifted up by the lock member 18. Accompanying the counterclockwise rotation of the lever 22, the force in the x direction borne by the lever 22A from the coil spring 28 becomes larger. By means of the force, the lever 22A rotates around the rotating shaft 23 counterclockwise. As a result, the movable member 29 on the −x direction side moves to the −x direction side, and the movable member 29 is in the state further pushed into the gap between the inclined surface 16a and the contacted surface 5a.

In such a state, when the seat ST is moved to the x direction side (forward side), to the movable member 29 on the −x direction side, the frictional force from the contacted surface 5a is applied to the −x direction side. Consequently, the movable member 29 on the −x direction side is to make relative movement to the −x direction side along the inclined surface 16a and thus, it is further pushed into the gap between the inclined surface 16a and the contacted surface 5a. As a result, the frictional force between the movable member 29 and the contacted surface becomes larger, and the sliding resistance borne by the seat ST at movement becomes larger. The sliding resistance in this case is substantially equal to the frictional force between the sliding member 15 and the slid surface 3S added to the frictional force between the movable member 29 and the contacted surface 5a.

On the other hand, when the seat ST is moved to the −x direction side (rearward side), to the movable member 29 on the −x direction side, the frictional force from the contacted surface 5a is applied on the x direction side. Consequently, the movable member 29 on the −x direction side is to make relative movement to the x direction side along the inclined surface 16a and is pulled out from the gap between the inclined surface 16a and the contacted surface 5a. As a result, the frictional force between the movable member 29 and the contacted surface becomes substantially zero, and the sliding resistance borne by the seat ST at movement becomes smaller. The sliding resistance in this case is substantially equal to the frictional force between the sliding member 15 and the slid surface 3S.

As described above, in this embodiment, the sliding resistance when the seat ST is moved to the x direction side is larger than the sliding resistance when the seat ST is moved to the −x direction side. Thus, according to the seat slide device 100B according to this embodiment, the working load of the occupant M when the seat ST is moved to the x direction side can be made substantially equal to the working load of the occupant M when the seat ST is moved to the −x direction side.

Further, this embodiment is configured such that, similarly to the first embodiment, the sliding resistance borne by the sliding member 15 when the upper rail 2 is moved is changed by the load in the vertical direction borne by the seat ST. Thus, the sliding resistance when the seat ST is made to slide can be changed appropriately in accordance with the situation without requiring a complicated mechanism.

FIG. 12 shows a state where the seatback of the seat ST is folded to the forward side, and the wire WR is pulled to the rearward side. In this state, since the upper end of the connecting section 27 is pulled by the wire WR, the lever 22A rotates around the rotating shaft 23 clockwise. As a result, the movable member 29 on the −x direction side has been moved to the x direction side, and the movable member 29 has been pulled out from the gap between the inclined surface 16a and the contacted surface 5a. In the state in FIG. 12, the frictional force is not generated between the movable member 29 and the contacted surface 5a in either of the forward side and the rearward side. Thus, the sliding resistance when the seat ST is moved is substantially equal to the frictional force between the sliding member 15 and the slid surface 3S regardless of the moving direction.

That is, this embodiment is configured such that the sliding resistance when the seat ST is moved is automatically switched by the inclination angle of the seatback between the state where the sliding resistance is different depending on the moving direction and the state where it is the same regardless of the moving direction.

Thus, by increasing the sliding resistance to the forward side when the occupant M is seated, anxiety is prevented from being given to the occupant. Further, when the occupant M is not seated, by decreasing the sliding resistance regardless of the moving direction of the seat ST, the working load of the occupant M can be made smaller.

This embodiment may also be so configured that, similarly to the second embodiment in FIGS. 8A and 8B, the roller 15R is provided on the rearward side (−x direction side) of the sliding member 15.

A fourth embodiment of the present invention will be explained with reference to FIGS. 13 to 16. In the following, the points different from the first embodiment will be mainly explained, and explanation on those in common with the first embodiment will be omitted as appropriate.

Figure 13:
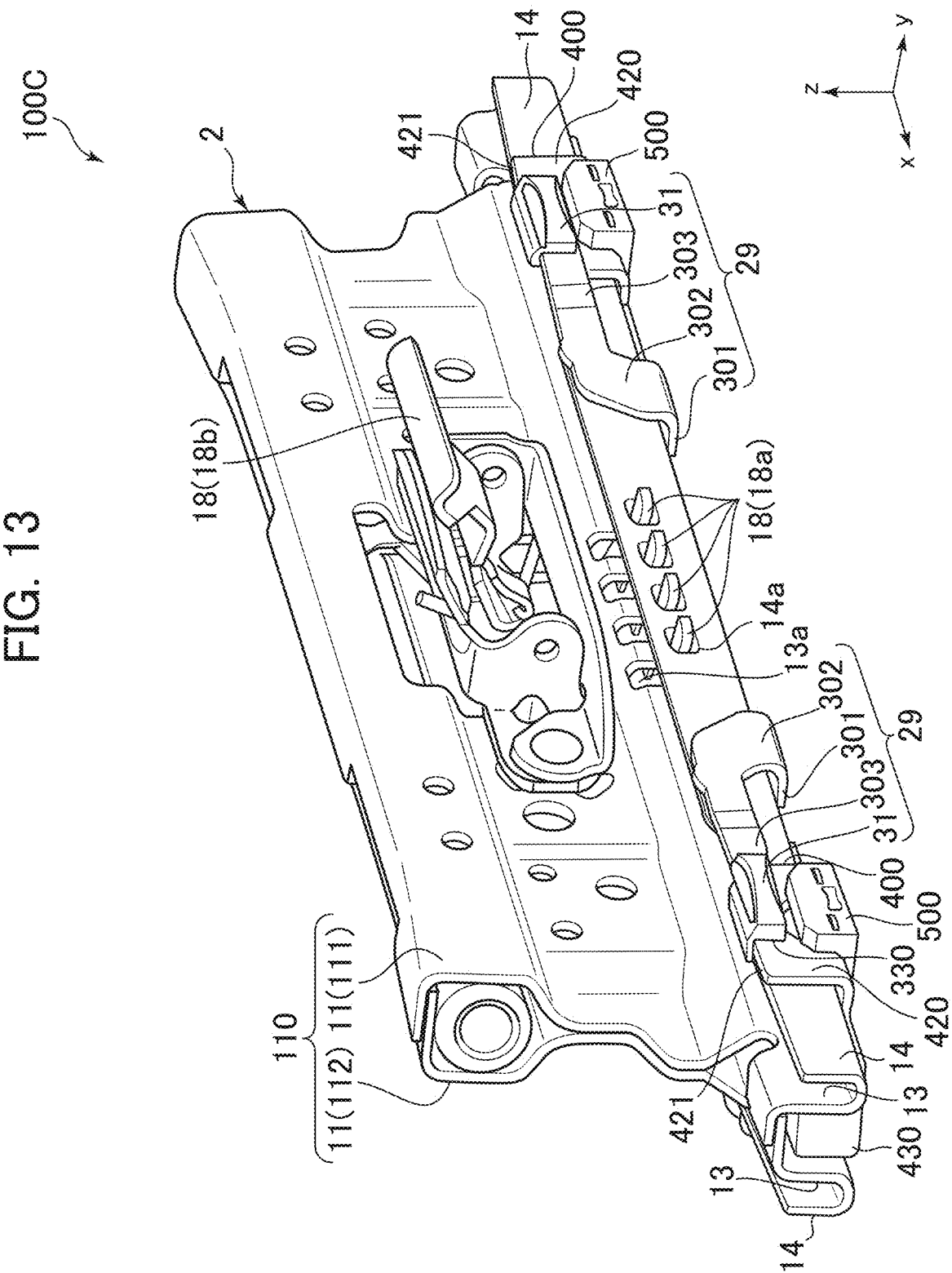
FIG. 13 is a view illustrating a shape of a portion excluding a lower rail in a seat slide device according to a fourth embodiment of the present invention.
Figure 14:
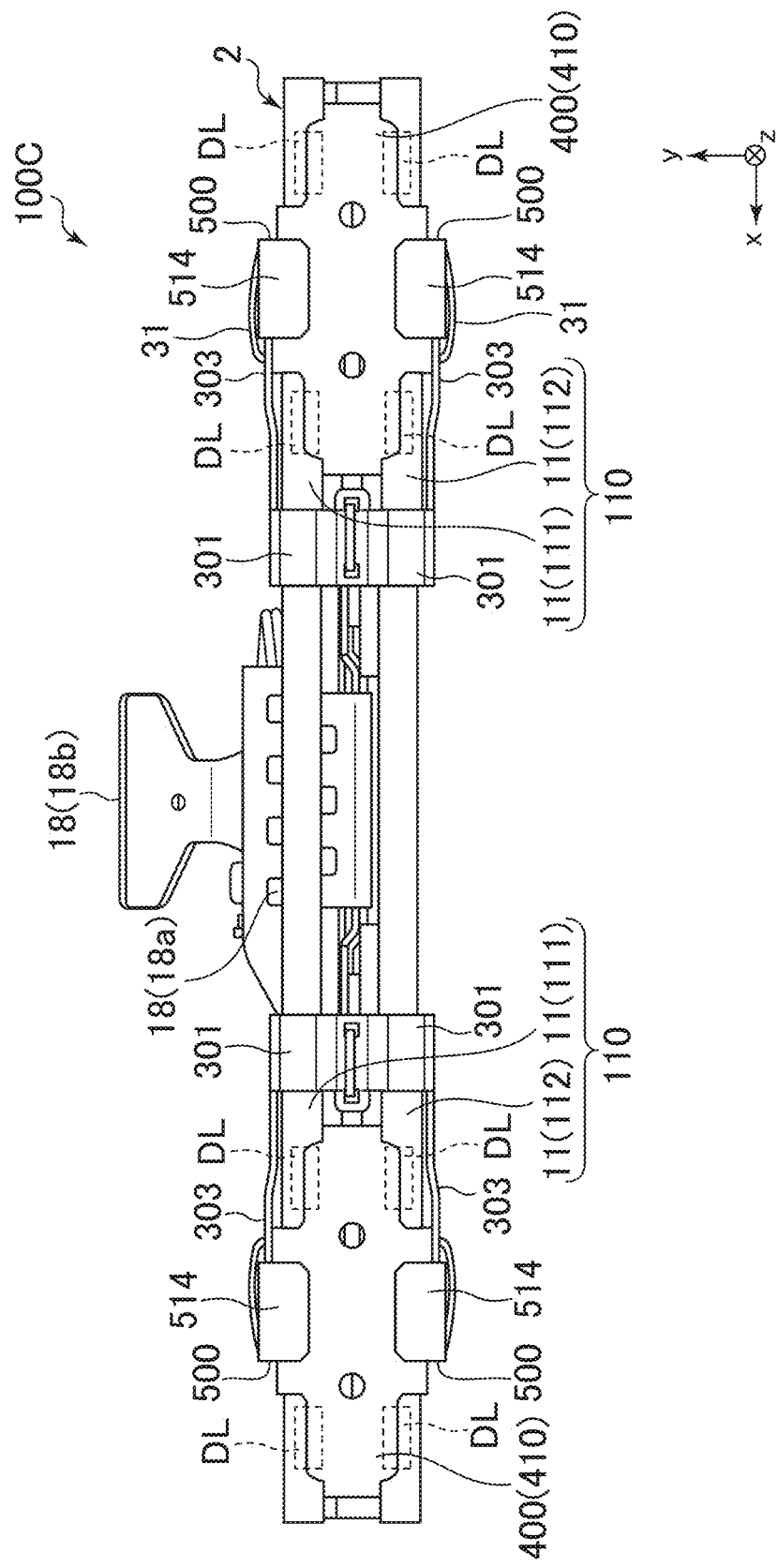
FIG. 14 is a view illustrating the shape of the portion excluding the lower rail in the seat slide device according to the fourth embodiment of the present invention.
Figure 15:
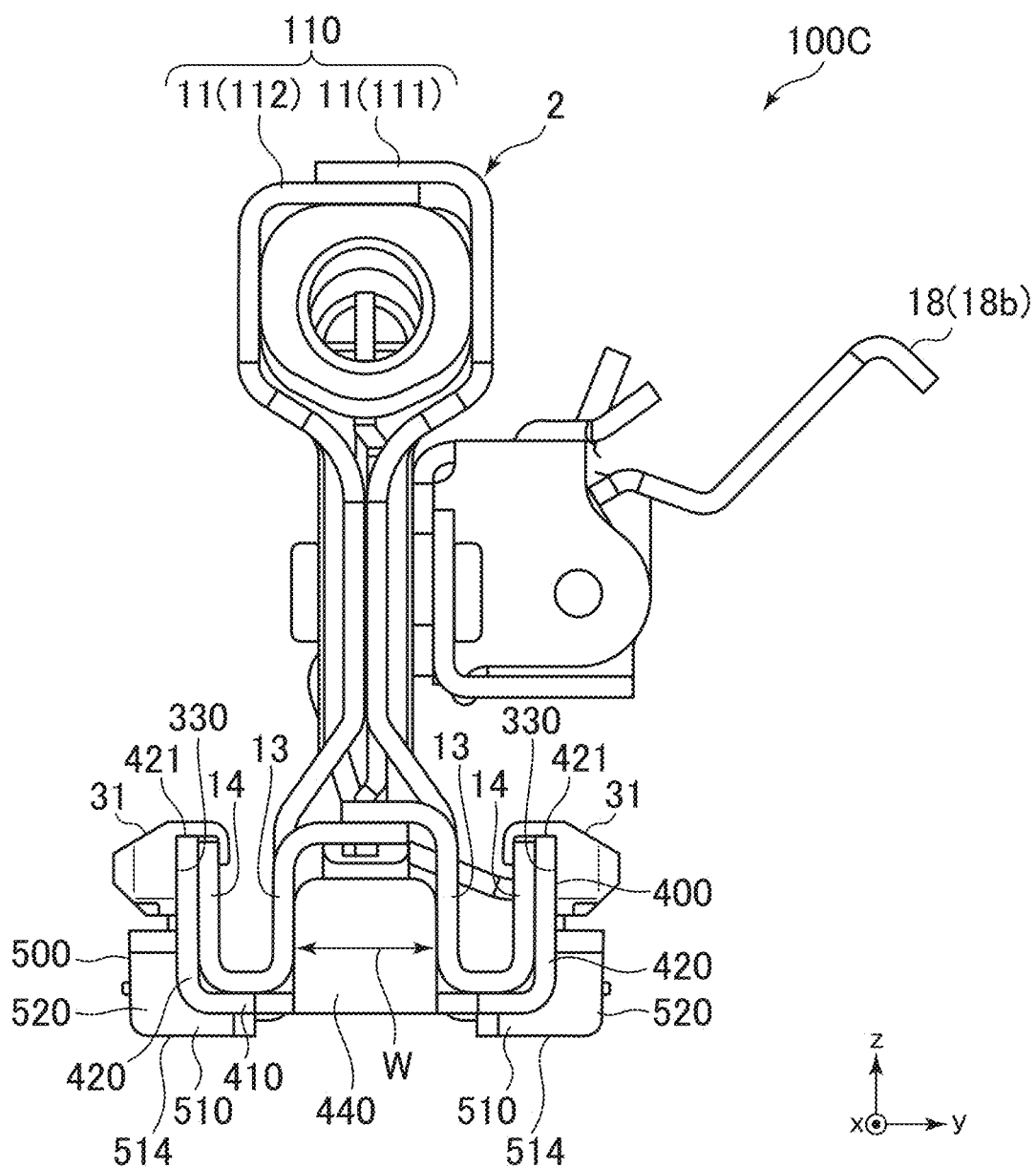
FIG. 15 is a view illustrating the shape of the portion excluding the lower rail in the seat slide device according to the fourth embodiment of the present invention.

FIGS. 13 to 15 show a configuration of portions of a seat slide device 100C according to this embodiment, excluding the lower rail 1. The movable member 29 in this embodiment has a configuration in which a first connecting section 302 and a second connecting section 303 are formed between the support section 301 and the arm section 31. The first connecting section 302 is a portion formed so as to extend from an end portion on an outer side along the y axis in the support section 301 to the z direction side. The second connecting section 303 is a portion formed so as to extend from an end portion on the z direction side of the first connecting section 302 toward the outer side along the x axis.

In the arm section 31 in this embodiment, the through-hole 33 as in the first embodiment is not formed but a groove 330 is formed instead. The groove 330 is a recess-shaped groove formed so as to retreat from an end surface on the −z direction side of the arm section 31 toward the z direction side. In the groove 330, a perpendicular section 420 which will be described later is inserted from the −z direction side.

In this embodiment, too, an interlocking mechanism similar to that explained in the first embodiment is provided. Thus, when the occupant operates the handle 20 and the operation section 18b is pushed down to the −z direction side and enters the lock state, the respective movable members 29 are moved to the direction away from the lock member 18 along the x axis. Further, when the operation section 18b is lifted up to the z direction side and enters the unlock state, the respective movable members 29 are moved to the direction getting closer to the lock member 18 along the x axis.

The metal plate 11 disposed on the y direction side in the two metal plates 11 provided in the upper rail 2 is noted also as a "first metal plate 111" below. The metal plate disposed on the −y direction side in the two metal plates 11 is also noted as a "second metal plate 112" below. Further a portion in the upper rail 2 on which the lock member 18 is provided, that is, the portion constituted by the first metal plate 111 and the second metal plate 112 above is also noted as a "body section 110" below.

The upper rail 2 in this embodiment includes a pair of plate members 400 in addition to the body section 110. In this embodiment, the sliding member 15 is not provided on the arm plate section 14 but a sliding member 500 is provided on the plate member 400 instead.

The plate member 400 is provided on a portion in the bottom surface of the body section 110 on the x direction side and a portion on the −x direction side, respectively. On each of the plate members 400, the sliding members 500 are provided two each. The shape of each of the plate members 400 is symmetrical to the y–z plane. In the following, the configurations of the plate member 400 disposed on the x direction side and the sliding member 500 provided on that will be mainly explained, and the explanation on configuration of the other plate member 400 and the like will be omitted.

As shown in FIG. 16, the plate member 400 is a plate-shaped member formed by pressing the metal plate. The plate member 400 has a horizontal section 410, a pair of perpendicular sections 420, and insertion sections 440 and 450.

The horizontal section 410 is a flat plate-shaped portion in parallel with the bottom surface of the body section 110, that is, with an end surface on the −z direction side (can be considered to be in parallel with an x-y plane) and is a portion in contact with the bottom surface.

The perpendicular sections 420 are flat plate-shaped portions formed so as to extend from each of the end portions on the y direction side and the end portion on the −y direction side in the horizontal section 410 toward the z direction side (upper side). The perpendicular sections 420 are portions in contact with the arm plate section 14 from the outer side. At a distal end of the perpendicular section 420 on the z direction side, an inclined surface 421 is formed. The inclined surface 421 is an inclined surface which goes toward the z direction side as it goes closer to the x direction side. That is, it is a surface inclined similarly to the inclined surface 16a in the first embodiment.

The insertion section 440 is a flat plate-shaped portion formed so as to extend from the end portion in the horizontal section 410 on the x direction side toward the z direction side (upper side). The insertion section 440 is a portion to be inserted into a gap between the first metal plate 111 and the second metal plate 112 or specifically a portion to be inserted between the side plate sections 13 opposed to each other. A dimension (width) of the insertion section 440 along the y axis is substantially equal to a distance between the side plate sections 13 opposed to each other.

The insertion section 450 is a flat plate-shaped portion formed so as to extend from the end portion in the horizontal section 410 on the −x direction side toward the z direction side (upper side). The insertion section 450 is a portion to be inserted into a gap between the first metal plate 111 and the second metal plate 112 or specifically a portion to be inserted between the side plate sections 13 opposed to each other similarly to the aforementioned insertion section 440. A dimension (width) of the insertion section 450 along the y axis is substantially equal to the distance between the side plate sections 13 opposed to each other.

On a border portion in the horizontal section 410 with the perpendicular section 420 on the y direction side, a protruding section 411 protruding to the y direction is formed. At positions in the horizontal section 410 to be both sides of the protruding section 411 along the x axis, a pair of notches 412 extending to the −y direction side are formed. Further, from a position to be an end portion on the −y direction side in each of the notches 412, a recess section 413 retreated to the center side along the x axis is formed.

The shape of the plate member 400 is symmetrical to an x-z plane. Thus, on the border portion in the horizontal section 410 with the perpendicular section 420 on the −y direction side, too, the protruding section 411, the notch 412, and the recess section 413 similar to the above are formed, respectively.

The shape of the sliding member 500 will be explained. In this embodiment, the shapes of the respective sliding members 500 are the same as each other. Thus, the shape of the sliding member 500 disposed on the y direction side will be mainly explained below, and explanation of the shape of the sliding member 500 disposed on the −y direction side will be omitted. FIG. 16 shows a state where the sliding member 500 disposed on the y direction side is removed from the plate member 400 along the y axis.

The sliding member 500 is a member generally formed by a resin similarly to the sliding member 15 in the first embodiment. The sliding member 500 has a horizontal section 510 and a perpendicular section 520. The horizontal section 510 is a plate-shaped portion in parallel with the horizontal section 410 of the plate member 400. A surface in the horizontal section 510 on the z direction side is a surface in contact with a surface in the horizontal section 410 on the −z direction side. Further, a surface 514 in the horizontal section 510 on the −z direction side is a flat plane in contact with the upper surface (slid surface 3S) of the bottom plate section 3 provided in the lower rail 1 similarly to the lower surface 15S of the sliding member 15 in the first embodiment.

The perpendicular section 520 is a plate-shaped portion in parallel with the perpendicular section 420 of the plate member 400. The perpendicular section 520 is formed so as to extend from the end portion in the horizontal section 510 on the y direction side toward the z direction. The surface in the perpendicular section 520 on the −y direction side is a surface in contact with the surface in the perpendicular section 420 on the y direction side.

On the surface in the horizontal section 510 on the z direction side, a pair of projections 511 is formed. Each of the projections 511 is formed so as to protrude to the z direction side and is formed so as to extend along the y axis. Further, at a distal end in each of the projections 511 on the −y direction side, a projecting section 512 is formed so as to protrude to the center side along the x axis. In a portion in the perpendicular section 520 between the pair of projections 511, a through-hole 513 is formed so as to pierce the perpendicular section 520 along the y axis.

The sliding member 500 may be generally formed by a resin as in this embodiment, but it may be configured such that only a portion in contact with the slid surface 3S is formed by a resin, while the other portions are formed by another material.

The sliding member 500 disposed on the y direction side can be fitted in the plate member 400 and fixed therein by being moved to the −y direction side from the position shown in FIG. 16. At this time, the protruding section 411 of the plate member 400 is inserted into the through-hole 513 of the sliding member 500. Further, the pair of projections 511 formed on the sliding member 500 is fitted in the pair of notches 412 formed in the plate member 400. At that time, since the projecting section 512 formed on the projection 511 is hooked by the recess section 413 formed in the notch 412, the sliding member 500 once fitted is prevented from being removed from the plate member 400. The sliding member 500 disposed on the −y direction side is also fitted in the plate member 400 and fixed thereto by the configuration similar to the above.

The plate member 400 in which the pair of sliding members 500 is fitted and fixed is welded and fixed to the bottom surface of the body section 110. In FIG. 14, the portion where the plate member 400 is welded to the body section 110 is indicated by a dot line DL.

As shown in the figure, the first metal plate 111 and the second metal plate 112 are separated from each other on a lower end portion of the body section 110, and the plate member 400 is welded and fixed so as to connect these separated portions. That is, the horizontal section 410 of the plate member 400 is welded and fixed to both the first metal plate 111 and the second metal plate 112.

In the seat slide device 100C according to this embodiment, the four sliding members 500 in total are fixed to the plate member 400 by being fitted therein. When the seat is moved in the front-back direction, each of the sliding members 500 moves along the x axis while sliding on the slid surface 3S. At that time, since the frictional force is generated between the surface 514 and the slid surface 3S, the upper rail 2 moves while bearing the sliding resistance caused by the frictional force. An effect obtained by the fact that such sliding members 500 are provided is the same as the effect already explained with reference to FIGS. 7A and 7B.

In this embodiment, as compared with the first embodiment in which mounting of the sliding members 15 is performed through the shaft SH, the sliding members 500 can be easily mounted on the upper rail 2. Thus, a manufacturing cost of the seat slide device 100C can be suppressed.

As shown in FIG. 15, in each of the arm sections 31, both the perpendicular section 420 and the side plate section 13 are inserted into the groove 330 from the −z direction side. In this embodiment, the end surface of the perpendicular section 420 on the z direction side, that is, the entire inclined surface 421 is disposed at a position further on the z direction side than the end surface of the side plate section 13 on the z direction side. Thus, an inner wall surface (that is, a top surface) of the groove 330 on the z direction side is in a state in contact with the inclined surface 421. The inner wall surface of the groove 330 on the z direction side is substantially in parallel with the inclined surface 421 opposed to this.

When the occupant operates the handle 20 and switches the unlock state to the lock state, as explained in the first embodiment, the movable member 29 moves in the direction away from the lock member 18. At this time, the arm section 31 of the movable member 29 moves along the inclined surface 421 and is sandwiched between the inclined surface 421 and the contacted surface 5a as a wedge. Consequently, rattling between the lower rail 1 and the upper rail 2 is suppressed. As described above, the inclined surface 421 of the plate member 400 in this embodiment functions as an alternative for the inclined surface 16a in the first embodiment.

The inclined surface 421 is formed on a part of the plate member 400 which is relatively small-sized. Thus, as compared with the configuration in which the inclined surface 16a is formed on a part of a member which is relatively large-sized as in the first embodiment, the inclined surface 421 can be formed easily and accurately.

When the function of suppressing rattling is to be realized, a distance from the surface 514 of the sliding member 500 to the inclined surface 421 is preferably uniform for each of the sliding members 500. In this embodiment, the distance described above is determined only by the plate member 400 which is a relatively small-sized member and the sliding member 500. Thus, the respective distances can be made equal relatively easily by improving the accuracy of the distances.

On the other hand, in the first embodiment, the distance from the lower surface 15S of the sliding member 15 to the inclined surface 16a is determined by the metal plate 11 which is a relatively large-sized member with a complicated shape, the shaft SH provided thereon, and the sliding member 15. Thus, the distances cannot be generally equal easily as compared with this embodiment. As described above, this embodiment is more preferable than the first embodiment also in realizing the function of suppressing rattling.

The respective sliding members 500 in this embodiment are both provided at the positions overlapped with the movable member 29 in the vertical direction. As a result, the force in the z direction borne by the upper rail 2 from the sliding member 500 and the force in the −z direction borne by the upper rail 2 from the movable member 29 are applied to the upper rail 2 at substantially the same position along the x axis. Thus, distortion generated in the upper rail 2 is smaller than the configuration in which the respective forces are applied to the upper rail 2 at different positions along the x axis. As described above, in this embodiment, rigidity of the upper rail 2 is improved by devising a positional relationship between the sliding member 500 and the movable members 29.

In a case of a collision of a vehicle, a force for lifting up to the z direction side is applied to the upper rail 2 by the impact of the collision. The force tends to be applied particularly strongly to a position to be an end portion in the upper rail 2 along the x axis, that is, in the vicinity of the portions where the respective plate members 400 are provided.

When such a force is applied, the body section 110 of the upper rail 2 is to be deformed such that the respective arm plate sections 14 are open outward and is to be deformed such that the respective side plate sections 13 get closer to each other. That is, deformation is to occur in a direction where the width W shown in FIG. 15 becomes smaller.

However, in this embodiment, as already described above, the horizontal section 410 of the plate member 400 is welded and fixed to both the first metal plate 111 and the second metal plate 112 separated away from each other. Thus, the deformation such that the width W in FIG. 15 is to become smaller is suppressed by the horizontal section 410. Further, in this embodiment, a part of the plate member 400 (insertion sections 440, 450) is inserted into the gap between the first metal plate 111 and the second metal plate 112. Thus, it becomes more difficult that the deformation such that the width W in FIG. 15 becomes smaller occurs.

Further, the outer side of each of the arm plate sections 14 is sandwiched by the pair of perpendicular sections 420. Thus, the deformation such that the respective arm plate sections 14 are open outward does not occur easily in this embodiment, either.

As described above, in this embodiment, deformation of the upper rail 2 at a collision of the vehicle can be suppressed by the plate member 400.

In the seat slide device 100C of this embodiment, a roller as shown with reference sign 15R in FIGS. 8A and 8B, for example, can be also used instead of the whole or a part of the sliding member 500.

The embodiments of the present invention have been explained with reference to the specific examples. However, the present invention is not limited to these specific examples. That is, examples to which those skilled in the art apply appropriate design changes to these specific examples are also contained within a range of the present invention as long as the features of the present invention are provided. Each of the elements included in each of the aforementioned specific examples and its arrangement, materials, conditions, shapes, sizes and the like are not limited to those exemplified but can be changed as appropriate. Further, each of the elements included in each of the aforementioned embodiments can be combined as long as it is technically possible, and they are also contained within the range of the present invention as long as the features of the present invention are provided.

What is claimed is:

1. A seat slide device provided in a vehicle, the seat slide device comprising:
   a lower rail fixed to a floor of the vehicle; and
   an upper rail fixed to a seat of the vehicle and supported to be movable in a longitudinal direction with respect to the lower rail, wherein
   the upper rail includes only one sliding member brought into contact with a slid surface of the lower rail from above;

the upper rail includes a plurality of rollers supporting the upper rail relative to the slid surface, every roller supporting the upper rail relative to the slid surface being contained in only one group of rollers, the entire group of rollers being located at a position on only one of a forward side and a rearward side in the upper rail in the longitudinal direction from the sliding member; and sliding resistance borne by the sliding member when the upper rail is moved is changed in accordance with a load in a vertical direction borne by the seat.

* * * * *